United States Patent
Bram et al.

(10) Patent No.: US 12,167,951 B1
(45) Date of Patent: *Dec. 17, 2024

(54) OSTEOTOMY DRILL BIT TO PRODUCE AN OPTIMALLY SHAPED JAWBONE OPENING FOR A DENTAL IMPLANT AND ABUTMENT

(71) Applicants: Gary Bram, Woodbury, NY (US); Isaac Tawil, Brooklyn, NY (US)

(72) Inventors: Gary Bram, Woodbury, NY (US); Isaac Tawil, Brooklyn, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/579,737

(22) Filed: Jan. 20, 2022

(51) Int. Cl.
*A61C 8/00* (2006.01)

(52) U.S. Cl.
CPC .................. *A61C 8/0089* (2013.01)

(58) Field of Classification Search
CPC .......... A61C 8/0089; A61C 8/00; A61C 3/02; A61C 5/25; A61B 17/1673; A61B 17/1662; A61B 17/16; A61B 17/1615; A61B 2090/062; A61B 17/1613; B23B 51/009; B23B 2251/408
USPC .................... 433/165; 408/22, 227
See application file for complete search history.

(56) References Cited

U.S. PATENT DOCUMENTS

| | | | |
|---|---|---|---|
| 137,434 A | 4/1873 | Gillespie | |
| 362,934 A * | 5/1887 | Champion | B23B 51/108 |
| | | | 279/86 |
| 372,400 A * | 11/1887 | Browne | A61C 3/02 |
| | | | 433/165 |
| 415,983 A * | 11/1889 | Starr | A61C 3/02 |
| | | | 433/165 |
| 430,522 A * | 6/1890 | Genese | A61C 13/30 |
| | | | 433/221 |

(Continued)

FOREIGN PATENT DOCUMENTS

| | | | | |
|---|---|---|---|---|
| DE | 19901176 A1 * | 7/2000 | | A61C 3/02 |
| FR | 2922751 A1 * | 5/2009 | | A61C 8/0022 |

(Continued)

OTHER PUBLICATIONS

Danger Ralf, "DE_19901176_A1_translated" (Year: 2000).*

(Continued)

*Primary Examiner* — Heidi M Eide
*Assistant Examiner* — Holly T. To
(74) *Attorney, Agent, or Firm* — Thomas A. O'Rourke; James Bongiorno; O'Rourke IP Law, PLLC

(57) ABSTRACT

A first dental drill bit for creating a particularly shaped osteotomy in human jawbones includes: a mounting shank and cutting head. The cutting head includes: four blades protruding from an axis of the bit, each blade having a thickness and being positioned 90 degrees to each adjacent blade to form a cruciform-shaped cross-section. Each of the pair of blades are positioned 90 degrees apart, and the blades of each pair are offset laterally a distance about equal to one-half of the blade thickness. Each blade has a shaped periphery that includes: a first radiused periphery; and a second radiused periphery. The first radiused periphery is shaped to form a spherical frustum-shaped socket portion when rotated about the axis of the drill bit, and includes embedded diamond particles. The second radiused periphery is shaped to form a bullet shaped socket portion when rotated about the axis of the drill bit.

12 Claims, 17 Drawing Sheets

(56) References Cited

U.S. PATENT DOCUMENTS

| | | | |
|---|---|---|---|
| 703,063 A * | 6/1902 | Hawkins | A61C 3/02 433/165 |
| 716,441 A | 12/1902 | Latham | |
| 1,216,683 A | 2/1917 | Greenfield | |
| 1,333,388 A | 3/1920 | Chester | |
| 1,643,679 A * | 9/1927 | Roderick | B23B 51/107 408/223 |
| 2,264,922 A | 12/1941 | Hooser | |
| 2,347,567 A * | 4/1944 | Kresse | A61C 8/0022 424/618 |
| 2,711,021 A * | 6/1955 | Deming | A61C 8/0004 433/175 |
| 3,309,772 A * | 3/1967 | Lieb | A61C 3/02 76/108.1 |
| 3,461,875 A | 8/1969 | Hall | |
| 3,534,476 A * | 10/1970 | Winters | A61C 5/50 433/165 |
| 3,564,945 A * | 2/1971 | Bradley | B23B 51/009 408/227 |
| 3,672,058 A * | 6/1972 | Nikoghossian | A61C 8/0022 433/174 |
| 3,824,027 A * | 7/1974 | Janci | B23D 77/00 408/230 |
| 3,894,339 A * | 7/1975 | Manzi | A61C 3/06 433/166 |
| 4,021,920 A * | 5/1977 | Kirschner | A61C 8/0089 433/165 |
| 4,103,422 A * | 8/1978 | Weiss | A61C 8/0022 433/215 |
| 4,185,383 A * | 1/1980 | Heimke | A61C 8/00 433/201.1 |
| 4,190,958 A | 3/1980 | Martin | |
| 4,273,117 A | 6/1981 | Neuhauser | |
| 4,290,756 A * | 9/1981 | Sellers | A61C 5/35 433/225 |
| 4,325,153 A | 4/1982 | Finnegan | |
| 4,341,206 A | 7/1982 | Perrett | |
| 4,345,899 A | 8/1982 | Vlock | |
| 4,473,354 A * | 9/1984 | Rigaud | A61C 3/02 433/218 |
| 4,504,519 A | 3/1985 | Zelez | |
| 4,507,028 A | 3/1985 | Matsushita | |
| 4,561,812 A | 12/1985 | Linden | |
| 4,579,532 A * | 4/1986 | Lustig | A61C 5/35 433/225 |
| 4,681,541 A | 7/1987 | Snaper | |
| 4,738,616 A | 4/1988 | Reynaud | |
| 4,787,848 A | 11/1988 | Ross | |
| 4,936,721 A | 6/1990 | Meyer | |
| 4,951,690 A | 8/1990 | Baker | |
| 4,957,397 A | 9/1990 | Huff | |
| 4,976,739 A * | 12/1990 | Duthie, Jr. | A61C 8/0022 606/60 |
| 4,990,088 A * | 2/1991 | Weissman | A61C 3/02 433/102 |
| 5,051,092 A * | 9/1991 | Miller | A61C 3/02 433/225 |
| 5,066,230 A * | 11/1991 | Weissman | A61C 3/02 433/221 |
| 5,098,293 A | 3/1992 | Loof | |
| 5,098,737 A | 3/1992 | Collins | |
| 5,100,322 A | 3/1992 | Weissman | |
| 5,261,818 A | 11/1993 | Shaw | |
| 5,299,937 A | 4/1994 | Gow | |
| 5,429,504 A | 7/1995 | Peltier | |
| 5,569,035 A | 10/1996 | Balfour | |
| 5,573,537 A * | 11/1996 | Rogozinski | A61B 17/7092 606/80 |
| 5,575,650 A * | 11/1996 | Niznick | A61C 8/0089 433/165 |
| 5,653,812 A | 8/1997 | Petrmichl | |
| 5,660,186 A * | 8/1997 | Bachir | A61B 10/0233 600/562 |
| 5,681,653 A * | 10/1997 | Hammond | C23C 30/005 428/408 |
| 5,762,498 A * | 6/1998 | Gonzalez | A61C 8/0089 433/165 |
| 5,763,087 A | 6/1998 | Falabella | |
| 5,766,394 A | 6/1998 | Anderson | |
| 5,772,760 A | 6/1998 | Gruen | |
| 5,791,902 A * | 8/1998 | Lauks | A61C 8/0089 433/165 |
| 5,799,549 A * | 9/1998 | Decker | C23C 14/225 76/DIG. 8 |
| 5,816,807 A * | 10/1998 | Matsutani | A61C 3/02 433/165 |
| 5,868,572 A * | 2/1999 | Lazzara | A61C 1/084 433/165 |
| 5,941,706 A * | 8/1999 | Ura | A61C 3/02 433/165 |
| 6,146,138 A * | 11/2000 | Dalmau | A61C 8/0006 433/141 |
| 6,179,615 B1 * | 1/2001 | Blacklock | A61C 8/0089 408/209 |
| 6,312,432 B1 * | 11/2001 | Leppelmeier | A61B 17/1615 408/230 |
| 6,364,662 B1 * | 4/2002 | Kumar | A61B 17/1673 433/165 |
| 6,419,490 B1 * | 7/2002 | Kitchings, Jr. | A61C 8/0089 433/165 |
| 6,641,395 B2 | 11/2003 | Kumar | |
| RE38,630 E * | 10/2004 | Lazzara | A61C 8/0089 433/165 |
| 6,863,529 B2 | 3/2005 | Strong | |
| 7,290,965 B2 * | 11/2007 | Gaiser | B23B 51/105 407/53 |
| 7,547,210 B1 * | 6/2009 | Valen | A61C 8/0089 433/165 |
| 8,770,974 B2 * | 7/2014 | Suter | A61C 8/0089 433/165 |
| 8,899,980 B2 * | 12/2014 | Chen | A61C 1/087 433/165 |
| D741,484 S * | 10/2015 | Cho | D24/146 |
| 10,543,059 B2 | 1/2020 | Shioiri | A61C 3/02 |
| D898,915 S * | 10/2020 | Chen | D24/152 |
| 11,471,172 B1 | 10/2022 | Bram | A61B 17/1615 |
| 2002/0031745 A1 * | 3/2002 | Kumar | A61B 17/1615 433/165 |
| 2002/0094508 A1 * | 7/2002 | Lorenzi | A61C 8/0089 433/165 |
| 2002/0102141 A1 * | 8/2002 | Meece | B23D 77/00 408/230 |
| 2002/0172923 A1 * | 11/2002 | Strong | A61C 8/0089 433/165 |
| 2003/0022132 A1 * | 1/2003 | Jesch | A61C 8/0089 433/165 |
| 2003/0036036 A1 * | 2/2003 | Porter | A61C 8/0098 433/144 |
| 2003/0143513 A1 * | 7/2003 | Flanagan | A61B 17/1673 433/141 |
| 2003/0228556 A1 * | 12/2003 | Giorno | A61C 8/0075 433/174 |
| 2004/0081940 A1 * | 4/2004 | Roetzer | A61C 3/02 433/165 |
| 2005/0003327 A1 * | 1/2005 | Elian | A61C 8/0089 433/165 |
| 2005/0026114 A1 * | 2/2005 | Nilo | A61C 8/0089 433/165 |
| 2006/0046229 A1 * | 3/2006 | Teich | A61C 5/40 433/173 |
| 2006/0105293 A1 * | 5/2006 | Funato | A61C 3/02 433/165 |
| 2006/0210949 A1 * | 9/2006 | Stoop | A61C 8/0089 433/165 |
| 2007/0065777 A1 * | 3/2007 | Becker | A61C 3/02 433/165 |
| 2007/0202461 A1 * | 8/2007 | Wang | A61C 3/02 433/165 |

(56) References Cited

U.S. PATENT DOCUMENTS

| | | | | |
|---|---|---|---|---|
| 2007/0248935 A1* | 10/2007 | Danger | A61C 3/02 | 433/165 |
| 2007/0298374 A1* | 12/2007 | Carlton | A61C 8/0089 | 433/173 |
| 2007/0298376 A1* | 12/2007 | Kmiecz | A61C 8/0089 | 433/165 |
| 2008/0085488 A1* | 4/2008 | Lazarof | A61C 8/0089 | 433/50 |
| 2008/0124682 A1* | 5/2008 | Nordin | A61C 5/42 | 433/220 |
| 2009/0053674 A1* | 2/2009 | Danger | A61C 3/02 | 433/102 |
| 2009/0080989 A1* | 3/2009 | Dost | B27G 15/00 | 408/230 |
| 2009/0239200 A1 | 9/2009 | Brajnovic | | |
| 2009/0274996 A1* | 11/2009 | Miller | A61C 3/02 | 433/165 |
| 2009/0305189 A1* | 12/2009 | Scortecci | A61C 8/0089 | 433/165 |
| 2010/0112517 A1* | 5/2010 | Chen | A61C 8/0089 | 433/165 |
| 2010/0145341 A1* | 6/2010 | Ranck | A61B 17/1615 | 606/167 |
| 2010/0173263 A1* | 7/2010 | Tetsuka | A61C 3/02 | 433/165 |
| 2011/0250568 A1* | 10/2011 | Machado | A61C 5/35 | 433/225 |
| 2012/0045731 A1* | 2/2012 | Singh | A61C 8/0089 | 433/76 |
| 2012/0244497 A1* | 9/2012 | Huwais | A61C 8/0089 | 433/165 |
| 2012/0330315 A1 | 12/2012 | Ranck | | |
| 2013/0004253 A1* | 1/2013 | Kauper | B23B 51/08 | 408/230 |
| 2013/0218160 A1* | 8/2013 | Bjorn | A61B 17/1695 | 606/80 |
| 2013/0244202 A1* | 9/2013 | Chen | A61C 8/0022 | 433/165 |
| 2014/0030674 A1* | 1/2014 | Nguyen | A61C 8/0036 | 433/201.1 |
| 2014/0127640 A1* | 5/2014 | Zacharia | A61C 1/0069 | 433/82 |
| 2014/0220508 A1* | 8/2014 | Scalise | A61C 8/0089 | 433/173 |
| 2014/0241819 A1* | 8/2014 | Munce | A61C 3/02 | 407/30 |
| 2015/0150565 A1* | 6/2015 | Huwais | A61C 8/0089 | 606/84 |
| 2015/0250557 A1* | 9/2015 | Simmons, Jr. | A61C 1/084 | 433/118 |
| 2015/0342709 A1* | 12/2015 | Huwais | A61C 8/0089 | 433/173 |
| 2018/0055614 A1* | 3/2018 | Srayeddin | A61C 8/0022 | |
| 2018/0071058 A1* | 3/2018 | Yahav | A61C 8/0006 | |
| 2018/0132969 A1* | 5/2018 | Yahav | A61C 8/0089 | |
| 2019/0299302 A1* | 10/2019 | Terashima | B23B 51/02 | |
| 2019/0314905 A1* | 10/2019 | Van Essen | B25B 15/001 | |
| 2019/0321144 A1* | 10/2019 | Kim | A61C 8/0089 | |
| 2020/0046458 A1* | 2/2020 | Lampl | A61C 5/35 | |
| 2021/0282903 A1* | 9/2021 | Fischer | A61C 8/0034 | |
| 2022/0039914 A1* | 2/2022 | Wu | A61C 1/08 | |

FOREIGN PATENT DOCUMENTS

| | | |
|---|---|---|
| JP | H06125923 A | 5/1994 |
| KR | 101166161 B1 | 7/2012 |
| KR | 200467202 Y1 | 6/2013 |
| KR | 20190035012 A | 4/2019 |
| KR | 20190116604 A | 10/2019 |
| WO | WO1990005498 A1 | 5/1990 |
| WO | WO 94/20247 | 9/1994 |
| WO | WO 2004/100820 | 11/2004 |
| WO | WO2011046294 A3 | 7/2011 |
| WO | WO2014123951 A1 | 8/2014 |

OTHER PUBLICATIONS

Sid Park, "What are pointed bullets called?" (Year: 2021).*
Borel Jean Francois, "FR_2922751_A1_I_translated" (Year: 2009).*
Press Fit Forces Stress Design Calculator, Jun. 18, 2018, available at: www.engineersedge.com/calculators/machine-design/press-fit/press-fit.htm.
"Three General Types of Fit," available at www.mmto.org/~dclark/Reports/Encoder%20Upgrade/fittolerences%20%5BRead-Only%5D.pdf, Jul. 8, 2019.
"Engineering Fit," available at: https://en.wikipedia.org/wiki/Engineering_fit, Jul. 8, 2019.

\* cited by examiner

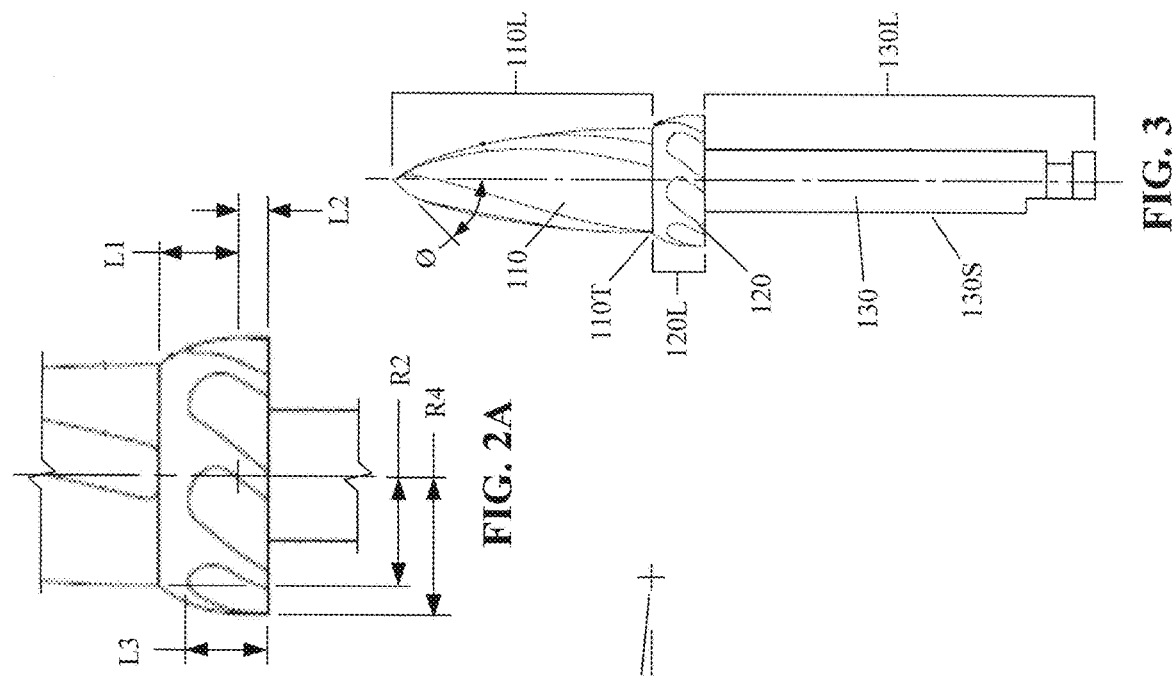
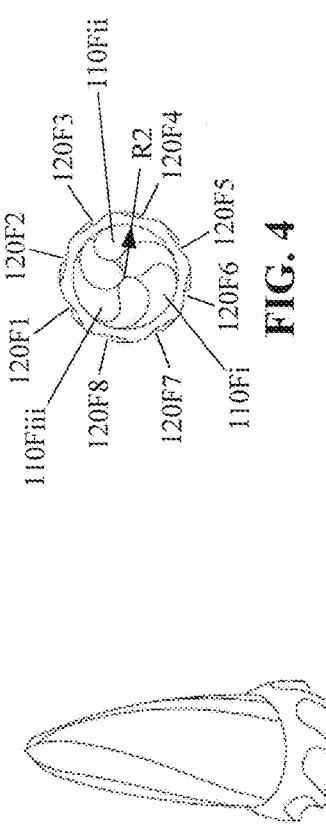

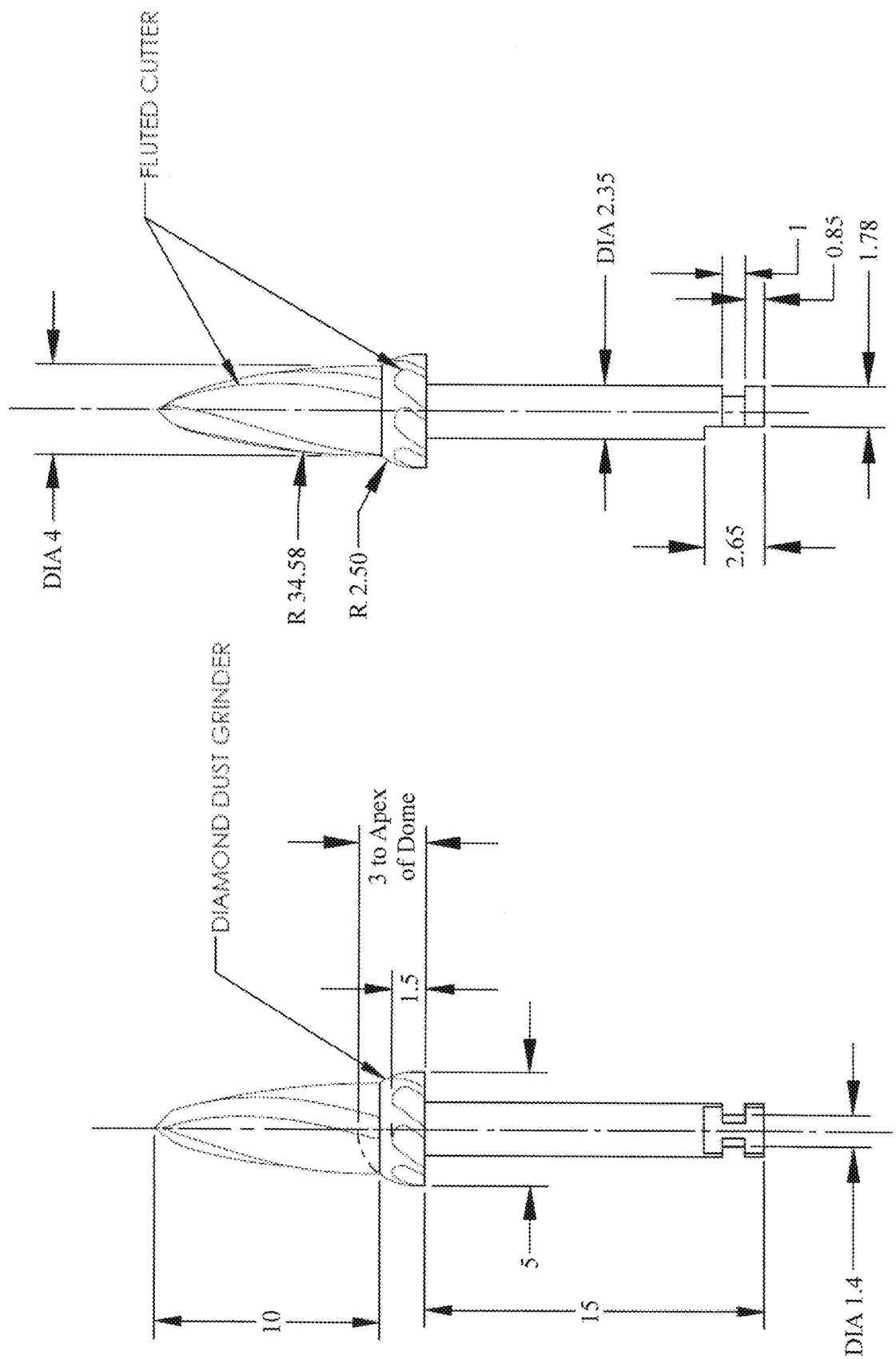

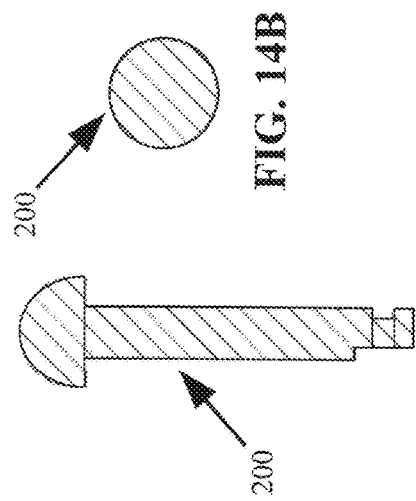
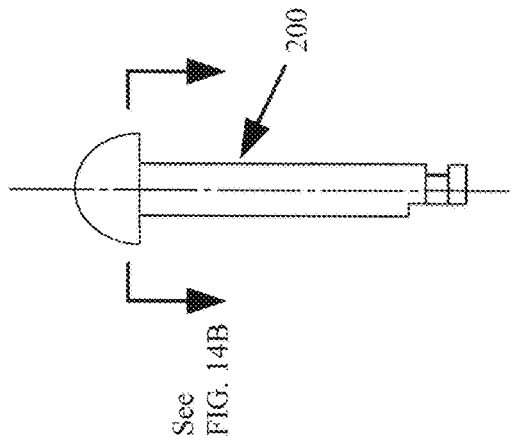
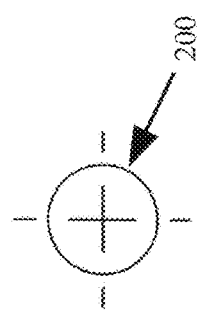
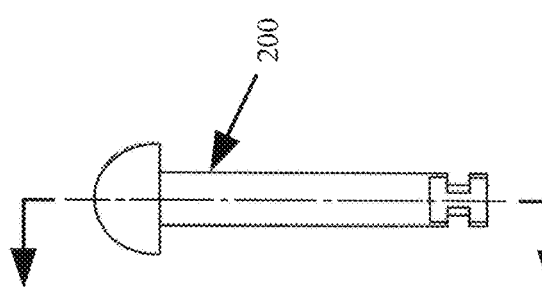
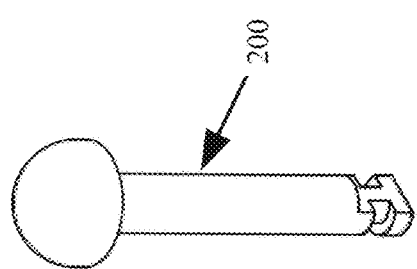

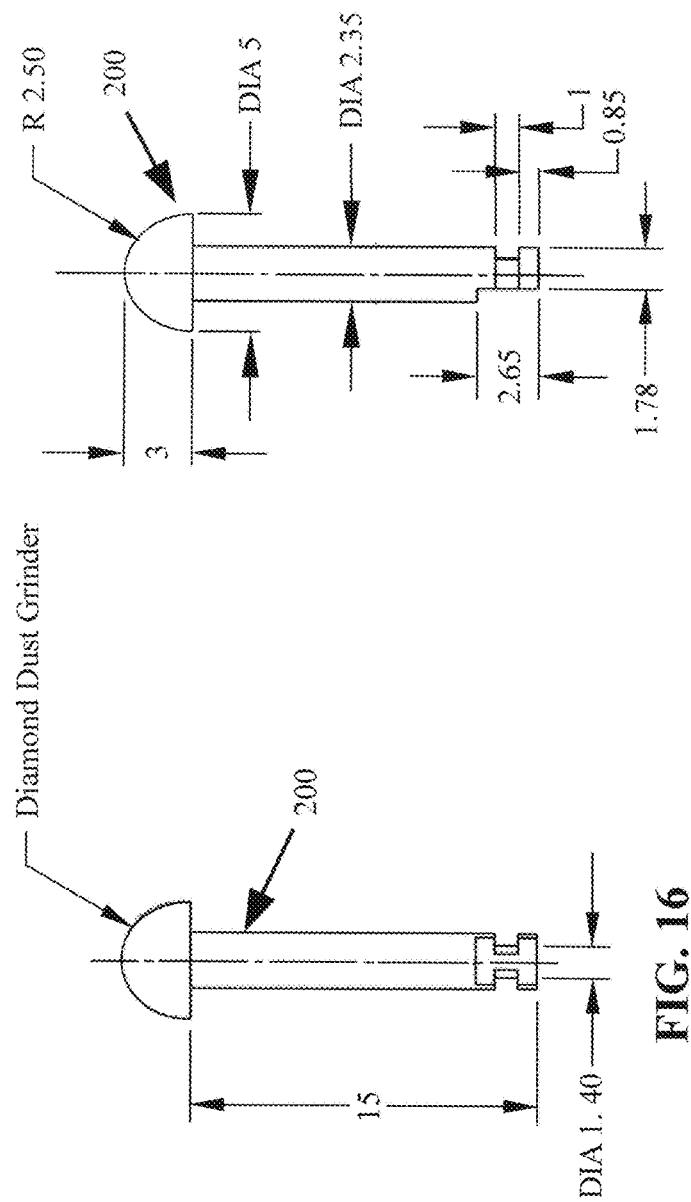

4 mm X 8.5 mm 4 mm X 10 mm 4 mm X 11.5 mm 4 mm X 13 mm 5 mm X 8.5 mm 5 mm X 10 mm 5 mm X 11.5 mm 5 mm X 13 mm 6 mm X 8.5 mm 6 mm X 10 mm 6 mm X 11.5 mm 6 mm X 13 mm 6 mm X 4 mm 7 mm X 4 mm 8 mm X 4 mm

OSTEOTOMY DRILL BIT TO PRODUCE AN OPTIMALLY SHAPED JAWBONE OPENING FOR A DENTAL IMPLANT AND ABUTMENT

FIELD OF THE INVENTION

The subject technology relates generally to preparing a surgical site for an endosseous implant, and more particularly to a dental drill bit for forming an optimally shaped opening in a human jawbone that includes a first opening portion that receives and accommodates the implant, and a second opening portion that accommodates an abutment.

BACKGROUND OF THE INVENTION

Several decades ago the loss of teeth was remedied by the use of dentures that were constructed to replace the missing teeth and which were supported by surrounding teeth and/or by underlying tissue. The use of dentures has long been supplanted by implants that receive a corresponding abutment and a crown.

Dental implants are typically endosteal, being a "root" device that is usually made of titanium, and which is inserted into a hole formed in the jaw through the bone at the alveolar ridges. During the healing period, osseointegration occurs in which the bone grows in and around the implant to provide support. Thereafter the abutment may be attached to the implant, with the abutment protruding through the periostium and being positioned to receive a crown that resembles a tooth.

There are a couple of approaches for preparing the surgical site, i.e., for creating a socket in the jaw bone region where the implant is to be installed. With either approach, a small pilot hole, usually 2 mm in diameter, is typically drilled in the alveolar ridge to define the axis of the implant socket that will ultimately receive the implant. Thereafter, with the first method, successively larger diameter osteotomes may be inserted into the pilot hole for bone compaction to widen the opening sufficiently to receive the implant. Alternatively, in the second method, the pilot hole is enlarged using a conventional dental drill bit.

The dental drill bit disclosed herein improves upon the opening formed by the prior art devices and methods.

It is noted that citing herein of any patents and published patent applications or non-patent literature is not an admission as to any of those references constituting prior art with respect to the herein disclosed dental drill bit.

OBJECTS OF THE INVENTION

It is an object of the invention to provide a dental drill bit configured to form an opening that in general will closely conform to a bullet-shaped portion of a dental implant.

It is another object of the invention to provide a dental drill bit configured to form an opening that is shaped like part of a sphere to conform to a portion of an abutment that is supported by the implant.

It is a further object of the invention to provide a dental drill bit configured to form a lower portion of an opening that closely conforms to a bullet shape of a dental implant, with an upper portion of the opening that is shaped like part of a sphere.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Dental implants, which are usually made of titanium, are inserted or threaded into implant sockets formed in the jaw through the bone at the alveolar ridges, and serve as an anchor for prosthetic devices, such as artificial teeth and crowns. After the healing period, during which time the bone grows in and around the implant to provide support, an abutment is attached to the implant, with the abutment protruding through the periostium and being positioned to receive a crown that resembles a tooth.

Formation of the socket in the jaw bone region—an implant receiving osteotomy-typically requires drilling a pilot hole that is thereafter enlarged using one or more conventional surgical drill bits.

A dental drill bit is disclosed herein that improves upon the opening formed by the prior art devices and methods, as it produces a particularly shaped opening in a human jawbone. A first embodiment of the dental drill bit includes first, second, and third portions. The first portion includes a bullet-shaped contour formed by revolving a curve about an axis creating an apex and a bottom, and is so shaped to correspond to a bullet-shaped portion of a dental implant. The second portion includes a spherical frustum formed coaxial with the axis of the bullet-shaped contour, and extends from the bottom of the bullet-shaped contour, and corresponds to a portion of an abutment that is supported by the implant. The first and second portions may also each include flutes for cutting/drilling into bone. The third portion includes a shaft that extends from a bottom of the spherical frustum and is formed co-axial with the axis of the bullet-shaped contour, and is configured to be secured within a dental drill. A second embodiment of the drill bit is instead formed by a plurality of blades, each with an outer profile having a first portion shaped to form a bullet-shaped contour for the osteotomy, and a second portion shaped to accommodate the abutment.

A second embodiment of the dental drill bit includes: a mounting shank, and a cutting head. The mounting shank has a proximal end and a distal end, where the proximal end is configured to be received within a drill. The cutting head has a proximal end and a distal end, with the distal end of the mounting shank transitioning into the proximal end of the cutting head. The cutting head includes: four blades protruding away from an axis of the drill bit, each blade having a thickness and being positioned 90 degrees to an adjacent the blade to form a cruciform-shaped cross-section, with two pairs of the blades each positioned 90 degrees apart. Also, each of the pair of blades positioned 90 degrees apart are offset laterally with respect to the axis a distance about equal to one-half of the blade thickness, and each blade has a shaped periphery that includes: a first radiused periphery; and a second radiused periphery. The first radiused periphery is shaped to form a spherical frustum-shaped socket portion when rotated about the axis of the drill bit. The second radiused periphery is shaped to form a bullet shaped socket portion when rotated about the axis of the drill bit; wherein a distal end of the first radiused periphery transitions into a proximal end of the second radiused periphery. Each blade is formed with a rake angle in a range between 3 degrees to 20 degrees. The second radiused periphery for each the pair of blades is spaced apart about 3.5 mm, and each has a length in the range of 8.5 mm to 13 mm. The distal end of the second radiused periphery is chamfered at an angle between 20 degrees to 40 degrees. In one embodiment, the second radiused periphery has a radius of about 73 mm to about 83 mm; and the first radiused periphery has a radius of about 3 mm.

BRIEF DESCRIPTION OF THE DRAWINGS

The description of the various example embodiments is explained in conjunction with appended drawings, in which:

FIG. 1 is a perspective view illustrating an osteotomy drill bit in accordance with a first embodiment;

FIG. 2 is a front view of the osteotomy drill bit of FIG. 1;

FIG. 2A is an enlarged detail view of the dome portion of the osteotomy drill bit of FIG. 2;

FIG. 3 is a side view of the osteotomy drill bit of FIG. 2;

FIG. 4 is a top view of the osteotomy drill bit of FIG. 2;

FIG. 5 is the front view of the osteotomy drill bit as shown in FIG. 2, but is shown dimensioned for a particular size implant;

FIG. 6 is a side view of the particular sized drill bit shown in FIG. 5;

FIG. 12 is a perspective view of a dome-shaped reamer that may be used in a finishing operation after formation of the opening in the jawbone shown in FIG. 9;

FIG. 13 is a front view of the dome-shaped reamer of FIG. 12;

FIG. 14 is a side view of the dome-shaped reamer of FIG. 12;

FIG. 14A is a cross-sectional view through the drill bit shown in FIG. 13;

FIG. 14B is a cross-sectional view through the top of the drill bit shown in FIG. 14;

FIG. 15 is a top view of the dome-shaped reamer of FIG. 12;

FIG. 16 is the front view of the dome-shaped reamer as shown in FIG. 12, but is shown dimensioned for a particular size for the dome-shaped reamer to be used after the particularly sized drill bit shown in FIG. 16-17;

FIG. 17 is a side view of the dome-shaped reamer shown in FIG. 16;

FIG. 27 and FIG. 28 are first and second photos showing a first step before performing an osteotomy using the drill bit of FIG. 25, showing preparation of the prosthesis site, whereby the crown of the tooth has been removed;

FIG. 29 is a photo showing the drilling of a pilot hole in the prosthesis site shown in the photos of FIGS. 27-28;

FIG. 30 is a photo showing the pilot hole formed in the prosthesis site of FIGS. 27-28;

FIG. 31 is a photo showing the osteotomy drill bit of FIG. 25 being used to enlarge the pilot hole and being forming the implant socket;

FIG. 32 is a photo showing the osteotomy drill bit of FIG. 25 after reaching the desired depth needed to properly enlarge the pilot hole to form the implant socket;

FIG. 33 is a photo showing the osteotomy drill bit of FIG. 32 after being retracted partially;

FIG. 34 is a photo showing the osteotomy drill bit of FIG. 33 after being retracted further;

FIG. 35 is a photo showing the osteotomy drill bit of FIG. 34 after being almost fully retracted;

FIG. 36 shows the finished implant socket formed by the osteotomy drill bit of FIG. 25.

FIG. 40 is a section view of a jaw, showing a tooth embedded in bone, portions of which will form a prosthesis site;

FIG. 41 is the section view of FIG. 40, showing the osteotomy drill bit of FIG. 37 being used to form the finished implant socket;

FIG. 42 is the section view of FIG. 41, showing the finished implant socket, after the osteotomy drill bit has been removed;

FIG. 43 is the section view of FIG. 42, showing a dental implant post after being placed in the implant socket, which supports an abutment that holds the crown that replaces the natural visible tooth portion;

DETAILED DESCRIPTION OF THE INVENTION

Figure 8:
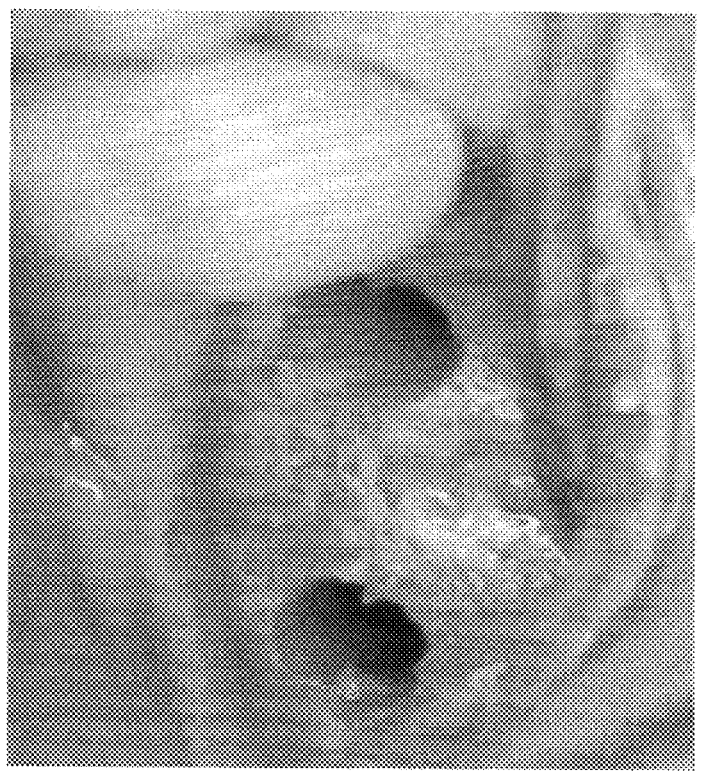
FIG. 8 is a photograph of two conventional dental implant openings formed in the jawbone of a patient using the conventional drill bit of FIG. 7.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder%20Upgrade/fittolerences%20%5BRead-Only%5D.pdf.

It is further noted that any use herein of relative terms such as "top," "bottom," "upper," "lower," "vertical," and "horizontal" are merely intended to be descriptive for the reader, and may be based on the depiction of those features within the figures for one particular position of the device, and such terms are not intended to limit the orientation with which the device of the present invention may be utilized.

There are a couple of approaches for creating an implant socket in the jaw bone region where the dental implant is to be installed. With either approach, a small pilot hole, usually a 2 mm diameter hole, is typically drilled in the alveolar ridge to define the axis of the implant socket that will ultimately receive the implant. Thereafter, with the first method, successively larger diameter osteotomes may be inserted into the pilot hole for bone compaction to widen the opening sufficiently to receive the implant.

Figure 7:
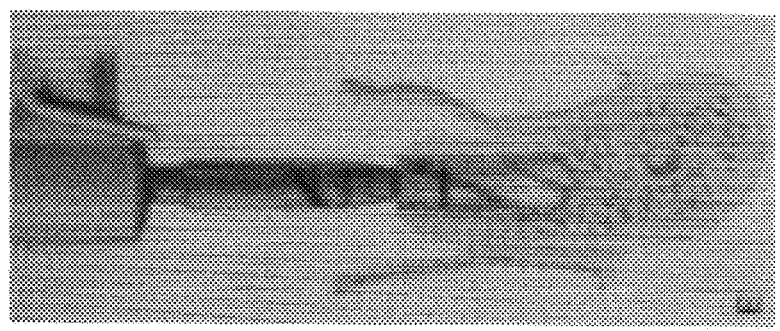
FIG. 7 is a cross-sectional image that illustrates a convention implant drill bit being used to form a cylindrical opening in the alveolar ridge for a dental implant.
Figure 10:
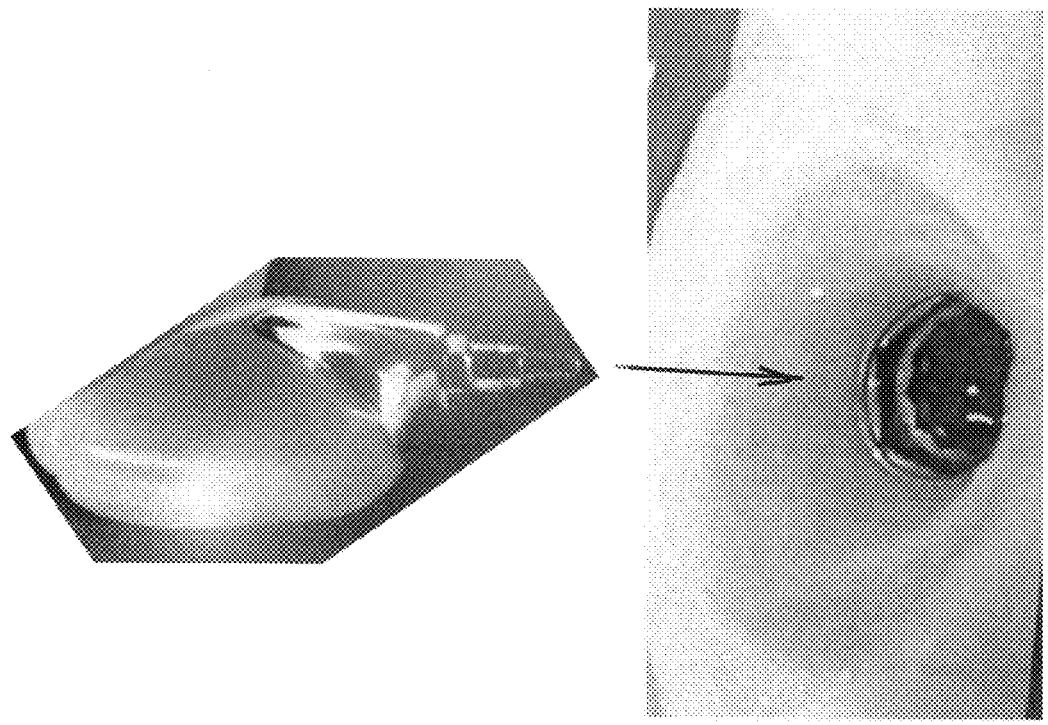
FIG. 10 is an exploded view that illustrates the opening in the jawbone that was formed in FIG. 9, but after an implant has been received therein, and prior to installation of the abutment and crown shown therein.

Alternatively, in the second method, the pilot hole is enlarged using a conventional dental drill bit (see e.g., U.S. Pat. No. 5,575,650 to Niznick; U.S. Pat. No. 5,868,572 to Lazzara; and U.S. Pat. No. 5,868,572 to Kumar). FIG. 7 illustrates a conventional drill bit being used to form a cylindrical opening for a dental implant, and FIG. 8 shows a photograph of two cylindrical dental implant openings formed in the jawbone of a patient using the conventional drill bit of FIG. 7.

In accordance with at least one embodiment of the present invention, as seen in FIGS. 1-3, a dental drill bit 100 for use in a drilling machine for drilling a particularly shaped opening in a human jawbone may broadly include a first portion 110, a second portion 120, and a third portion 130.

The first portion 110 may be formed with a bullet-shaped exterior contour. In particular, the bullet-shaped contour may be formed by revolving a curve about an axis 100X, which curve may be an arc having a radius R1 that is revolved about the axis 100X. As seen in FIG. 3, the arc may have a tangency that is parallel to the axis 100X at the base of the first portion where it adjoins the second portion 120 (i.e., at 110T), and the arc may extend away from the root a certain distance 110L. As seen in FIG. 2 and FIG. 4, the revolution of the end of the arc at that tangent point 110T may form a circle having a radius R2. The bullet-shaped contour being so formed is constructed for at least a portion thereof to approximate the shape of the implant that is to be received in the socket formed using the drill bit 100. However, the bullet-shaped contour is not intended to match the exact shape of the implant. The bullet-shaped contour is sized and formed, as discussed hereinafter, to drill a hole that is corresponds to the size of the implant to be used at a particular tooth location, in particular being intended to be slightly smaller than the implant (e.g., within a range of 0.005 inches and 0.007 inches smaller diametrically in one embodiment, or within a range of 0.007 inches and 0.010 inches smaller diametrically in another embodiment, or other ranges or a combination of such ranges may be used in other embodiments), which allows the smaller sized implant to be torqued into the osteotomy made by the drill a predetermined amount. Therefore, the bullet-shaped contour is thereby sized and formed to approximate the conical shape of most implants that are currently manufactured. As discussed hereinafter, if a larger implant is to be used, the drill will need to have a larger radius R1, and similarly, smaller implants will require a smaller radius R1.

In order for the first portion 110 to be able to cut into the jaw bone, a series of flutes may be formed in the bullet-shaped contour. There are preferably three flutes-a first helical shaped flute 110Fi, a second helical shaped flute 110Fii, and a third helical shaped flute 110Fiii, each formed in the bullet-shaped contour to be equally spaced about the axis 100X, as seen in FIG. 4. The tip of the first portion 110 may also be formed to have a more distinct point, by being formed with a chamfer C that may be at an angle θ to the axis 100X. The angle θ may be in the range of 20 degrees to 60 degrees, and may more preferably be in the range of 30 degrees to 55 degrees, and may most preferably be in the range of 40 degrees to 50 degrees.

The second portion 120 of the dental drill bit 100, as seen in the enlarged detail view in FIG. 2A, may also have two parts (120A and 120B), where the first part 120A is formed as part of a sphere, i.e., a spherical frustum (aka, a spherical segment), and the second part 120B being a cylinder that extends a distance L2 away from a base of the spherical frustum. Since the spherical frustum of the first part 120A preferably has a bottom that coincides with the equatorial plane of the sphere, it may also be considered to be a hemispherical frustum, having a base radius that is the full radius of the sphere, and an upper radius that is determined by the height L1 that is utilized. It is noted that both terms-spherical frustum and hemispherical frustum are used interchangeably herein. The axis of the hemispherical frustum of the first part 120A of the second portion 120 is formed to be substantially coaxial with the axis of rotation 100X used to form the bullet-shaped contour of the first portion 110. The hemispherical frustum may extend a distance L1 from the base of the bullet-shaped first portion to its equatorial plane, as seen in FIG. 2A. In one embodiment, the hemispherical frustum of the first part 120A and the cylinder of the second part 120B of the second portion 120 may also be formed with a plurality of flutes to achieved desired cutting to form the part-hemispherical surface in the alveolar ridge. The flutes may have sides that may be oriented at roughly a 45 degree angle to the axis. In one embodiment, as seen in FIG. 4, eight flutes may be formed in the hemispherical frustum of the first part 120A (i.e., flutes 120F1, 120F2, 120F3, 120F4, 120F5, 120F6, 120F7, 120F8). Other numbers of flutes may also be used. Also, in another embodiment, the flutes may be formed in the cylinder of the second part 120B of the second portion 120 and may only be formed to extend part-way along the hemispherical frustum of the first part 120A, (i.e., a distance L3) as shown in FIG. 2. In this embodiment, material removal may be accomplished by the small portion of the exposed hemispherical frustum beyond where the flutes terminate by impregnating a particular grit of diamond dust thereon (i.e., medium to coarse grit) for that surface to act as a grinder.

The hemispherical frustum of the first part 120A is so shaped with the flutes only extending a distance L3 so that it may form a corresponding opening in the bone that determines the region where the future crown and abutment will be placed, which is referred to herein as the "bedding" of the future crown and abutment, which seeks to replicate real human anatomy.

The use of the term "bedding" refers to the anatomically correct receiving zone for the future crown and abutment. Current drills only make the osteotomy for the implant. They fail to drill a shallow zone immediately outside of the implant that will function as the site to receive and be shaped to correspond to the future abutment and crown. Drill 100 is conceived and configured to accomplish both. Therefore, the "bedding" may be considered to be a second osteotomy, or an extension of the existing osteotomy that functions to accommodate the abutment, which abutments all tend to have a spherically shaped portion. Therefore, the corresponding spherical surface that is formed in the bone by the hemispherical frustum creates an anatomically correct spherical surface portion (a proper "receiving zone") for the future abutment (and crown) that will be placed 3-4 months later.

The third portion 130 may include a shaft 130S that may extend from the end of the cylinder of the second part 120B of the second portion 120. The axis of the shaft 130S is formed to be substantially co-axial with the axis of rotation 100X used to form the bullet-shaped contour of the first portion 110, and may extend a distance 130L from the end of the cylinder of the second part 120B, as seen in FIG. 3. A portion of the distal end of the shaft 130S may be formed with an annular recess, and may also be notched to form a flat surface thereon, which features on the shaft may be used for securing the dental drill bit 100 in the chuck of a drill machine or handpiece.

Figure 9:
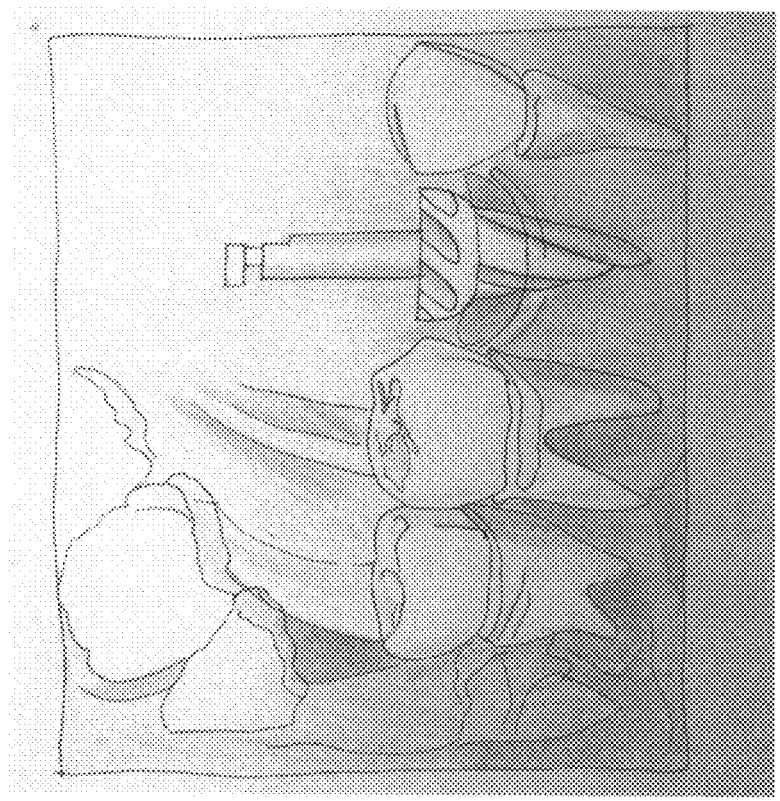
FIG. 9 illustrates a first embodiment of the dental drill bit disclosed herein being used to form an optimally shaped opening in a human jawbone.
Figure 11:
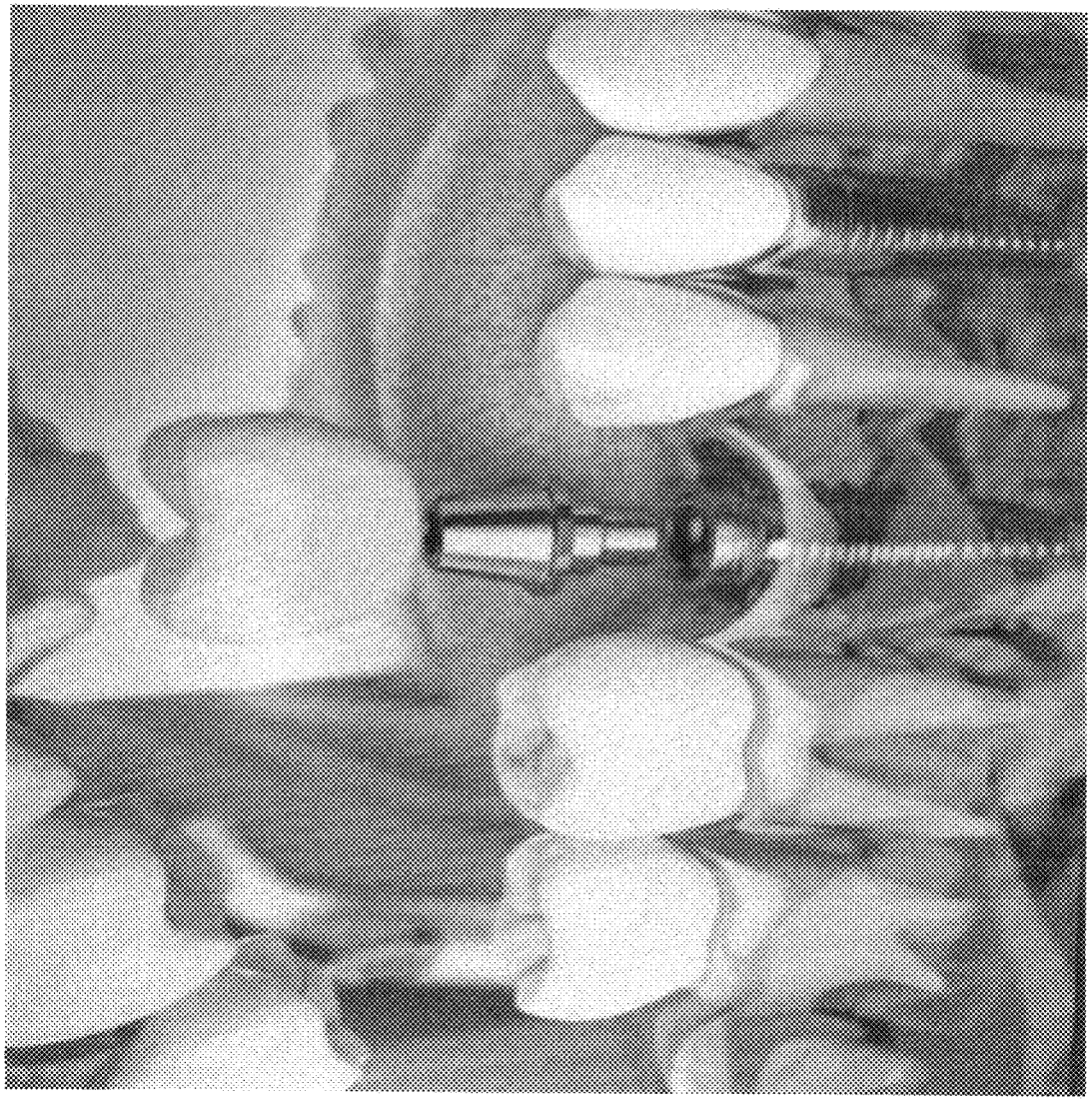
FIG. 11 is a transparent view showing an implant after being received in an opening formed as shown in FIG. 9, and just prior to receiving the abutment and crown thereon.

After the dental drill bit 100 has been used to form the two part opening in the jawbone (see FIG. 9) by using both the bullet-shaped exterior contour of the first portion 110 and the hemispherical frustum of the first part 120A of the second portion 120, the dome-shaped reamer 200 shown in FIGS. 12-14 may be used to clean up the spherical surface of the exposed jawbone. The spherical surface of the dome-shaped reamer 200 may be impregnated with a fine grit of diamond dust for the surface to act as a finish grinder.

Figure 18A:
FIGS. 18A-18D illustrate a series of different sized drill bits formed as shown generally in FIGS. 1-4, with each having the same 4 mm root, but having various different lengths for the bullet portion.
Figure 18B:
Figure 18C:
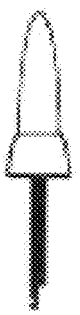
Figure 18D:
Figure 19A:
FIGS. 19A-19D illustrate a series of different sized drill bits formed as shown generally in FIGS. 1-4, with each having the same 5 mm root, but having various different lengths for the bullet portion.
Figure 19B:
Figure 19C:
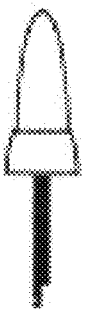
Figure 19D:
Figure 20A:
FIGS. 20A-20D illustrate a series of different sized drill bits formed as shown generally in FIGS. 1-4, with each having the same 6 mm root, but having various different lengths for the bullet portion.
Figure 20B:
Figure 20C:
Figure 20D:

FIGS. 5-6 illustrates one size for the dental drill bit in which the radius R1 of the arc is 34.6 mm, and the arc is positioned to revolve about the axis 100X at a radius R2 of 2 mm (i.e., a 4 mm diameter) to form a length 110L of 10 mm, and where the radius R3 of the hemispherical frustum of the first part 120A of the second portion 120 is 2.5 mm. (Note, the corresponding finish reamer is shown dimensioned in FIGS. 16-17). This particular size drill bit that is shown in FIGS. 5-6 is also shown in FIG. 18B (i.e., having a 4 mm diameter or 2 mm radius, and a 10 mm length for the bullet portion). FIGS. 18A-18D illustrate a family of such drill bits each of which has the 4 mm diameter and a different length 110L (i.e., lengths of 8.5 mm, 10 mm, 11.5 mm, and 13 mm). Similarly, FIGS. 19A-19D illustrate a family of such drill bits each of which has a 5 mm diameter, and a varying length, and FIGS. 20A-20D illustrate a family of such drill bits each of which has a 6 mm diameter and a varying length.

Figure 21A:
FIGS. 21A-21C illustrate a series of different sized dome-shaped reamers formed as shown generally in FIGS. 13-15.
Figure 21B:
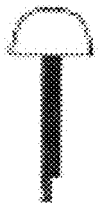
Figure 21C:

FIGS. 21A-21C show a corresponding series of finish reamers.

It is noted that the 34.58 mm radius and the corresponding radius R2 of 2 mm that is used for the dental drill bit of FIGS. 5-6 is used to accommodate implants that are 4 mm in diameter, which implant size is the most common diameter used in implant dentistry. It should also be noted that it is difficult to specifically identify which sized drill bit would tend to be used for each of the tooth numbers 2-18 and 15-31 because of the variation in bone sizes between different patients. The size of the implant that will be placed in the socket, and therefore the drill bit size used at a particular site, will to be selected to fit the width and the length of the bone at the tooth number undergoing the surgery, for that particular patient (i.e., the size/quality of the bone at tooth number 15 for a 5 foot tall 150 pound elderly and edentulous man will likely be quite different than the size/quality of the bone at tooth number 15 for a 6' 6" tall 275 pound 25 year old professional football player). In general, smaller implants will require socket formation using a smaller diameter drill bit, while larger implants will require use of larger diameter drill bits. As such, a kit may be formed containing each of the drill bits shown in FIGS. 18A-21C, and may include multiple drill bits of various diameters and lengths. The kit permits a drill bit to be chosen according to the dental implant surgeon's assessment of the bone parameters of the particular patient (e.g., width, length, bone quality, etc.). The drill bit that is selected for a particular tooth number of a particular patient is intended to be undersized relative to the implant that is to be used. After the osteotomy is drilled, the softness of the bone will allow the user to place the implant, similar to where an undersized hole is drilled into a wood beam into which a wood screw with a larger diameter is torqued and secured. The softness of the bone (or wood) relative to the implant (or screw) permits it to be installed despite the relative size difference.

It is further noted that the radius R1 and the radius of revolution R2 are interrelated, and as one radius changes in moving from a first drill bit size to a second drill bit size, so does the other radius; thus, the radius of 34.58 is not used on each drill bit shown in FIGS. 18A-20D.

Figure 22:
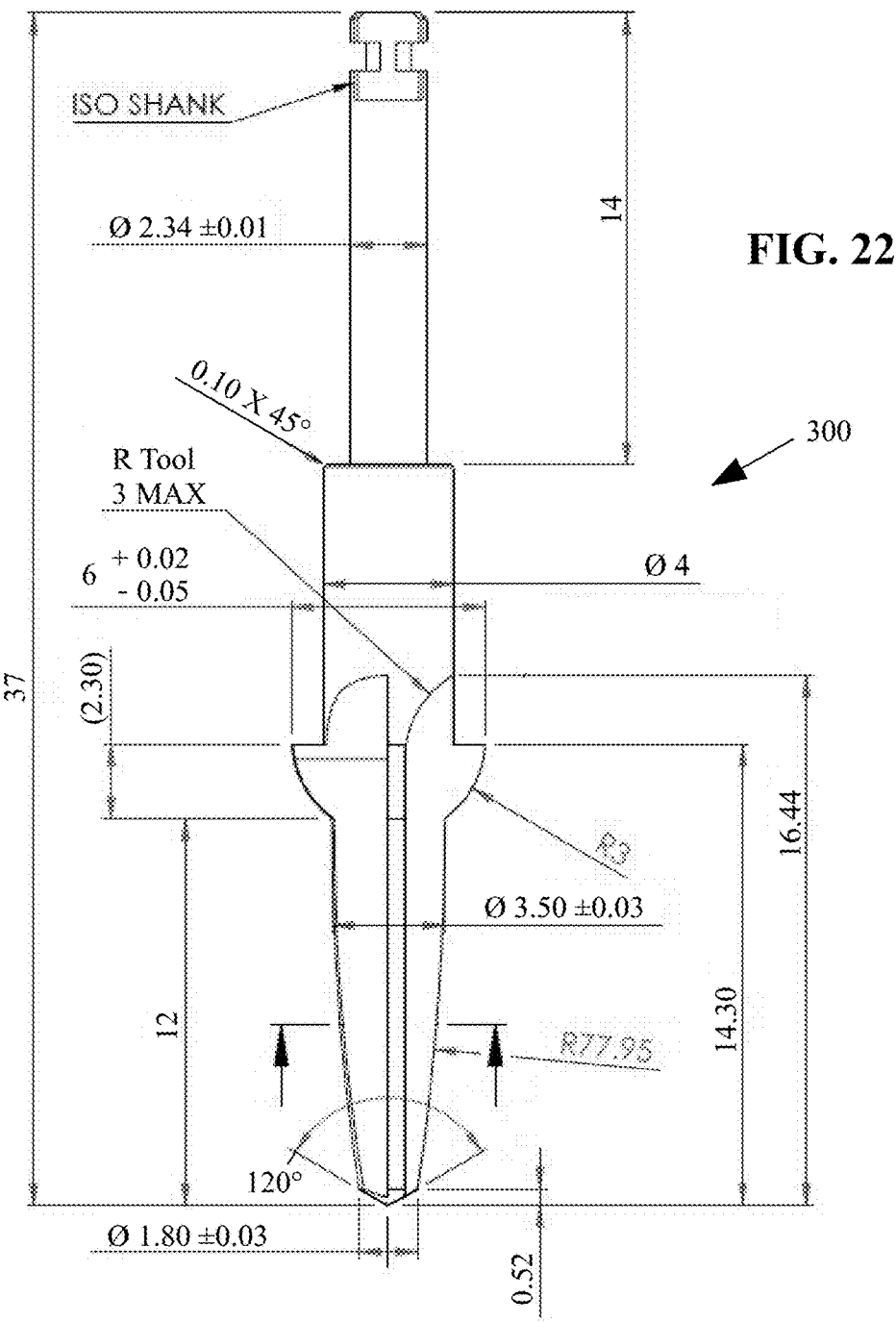
FIG. 22 is a front view of another embodiment of an osteotomy drill bit.
Figure 23:
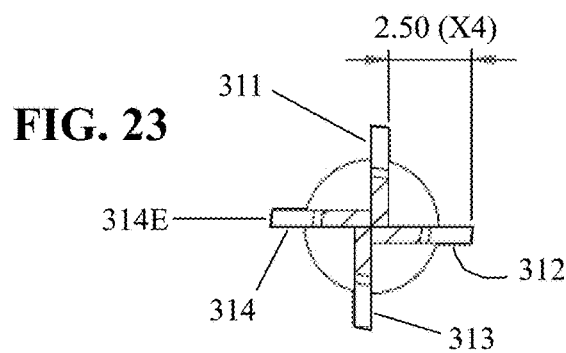
FIG. 23 is a cross-sectional view through the tip of the osteotomy drill bit of FIG. 22.

A drill bit 300 is shown in FIGS. 22-23, and is particularly shaped to form a bullet-shaped osteotomy that will receive an implant platform, and at the same time also form an opening that is shaped like part of a sphere to conform to a portion of an abutment that is supported by the implant platform.

Figure 22A:
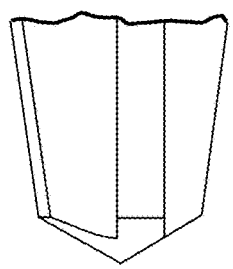
FIG. 22A is an enlarged detail view of the tip of the osteotomy drill bit of FIG. 22.
Figure 22B:
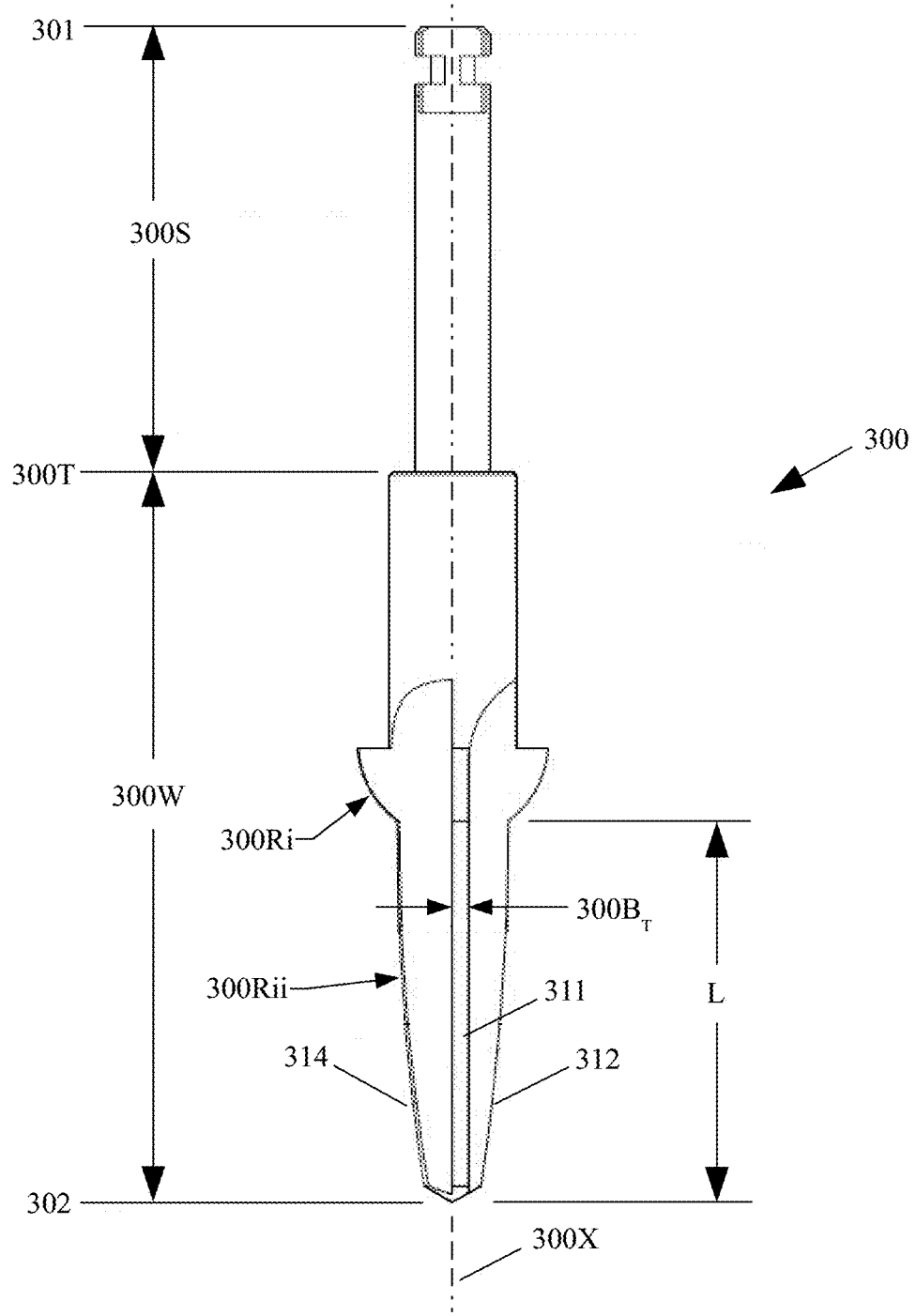
FIG. 22B is the front view of FIG. 22, annotated to identify other features shown therein.

As seen in FIG. 22B, the drill bit 300 may extend from a first end 301 to a second end 302, and may include a mounting shank 300S, having a portion proximate to the first end 301 configured to be received in a chuck of a dental drill or hand piece. The drill bit 300 may also have a working portion 300W that is adapted to cut or remove a portion of a tooth and a portion of the bone that supports the tooth.

The distal end of the mounting shank 300S may transition into the proximal end of the cutting head 300W at 300T. The cutting head incudes four blades protruding away from an axis 300X of the drill bit, a first blade 311, a second blade 312, a third blade 313, a fourth blade 314. Each of the blades have a thickness 300Br and each blade is positioned 90 degrees to an adjacent blade, as seen in FIG. 23 (i.e., the sharp distally protruding edge of blade 311 is positioned 180 degrees with respect to blade 313), to form a cruciform-shaped cross-section, with two pairs of the blades (i.e., blade pair 311/313, and blade pair 312/314). The rake angle at the distal end of each blade (e.g., end 314E shown in FIG. 23) may be in the range of about three degrees to about twenty degrees, and the rake angle may taper to a lesser angle at the proximal end of the blade (e.g., between about one degree to five degrees). Each of the pairs of blades that are positioned 180 degrees apart are also offset laterally with respect to the axis a distance that is about equal to one-half of the blade thickness, as shown in FIG. 23. Each blade has a shaped periphery that includes: a first radiused periphery 300Ri; and a second radiused periphery 300Rii, where a distal end of the first radiused periphery transitions into a proximal end of the second radiused periphery, as seen in FIGS. 22 and 22B. The first radiused periphery 300Ri is shaped to form a spherical frustum-shaped socket portion when rotated about the axis 300X of the drill bit. The second radiused periphery 300Rii is shaped to form a bullet shaped socket portion when rotated about the axis 300X of the drill bit. To be suitable for most implant sockets that may need to be formed, the second radiused periphery 300Rii preferably has a radius in the range of about 73 mm to about 83 mm, which radii for each pair of blades are spaced apart about 3.5 mm (see FIG. 22), and which may have various different lengths L depending upon which tooth location it will be used at to form the osteotomy, e.g., 8.5 mm, 10 mm, 11.5 mm, and 13 mm. The first radiused periphery may have a radius of about 3 mm. A distal end of the second radiused periphery 300Rii is preferably chamfered at an angle between 20 degrees to 40 degrees, and more preferably chamfered at an angle of between 25 degrees to 35 degrees, to form the tip shown in FIG. 22A.

Figure 24:
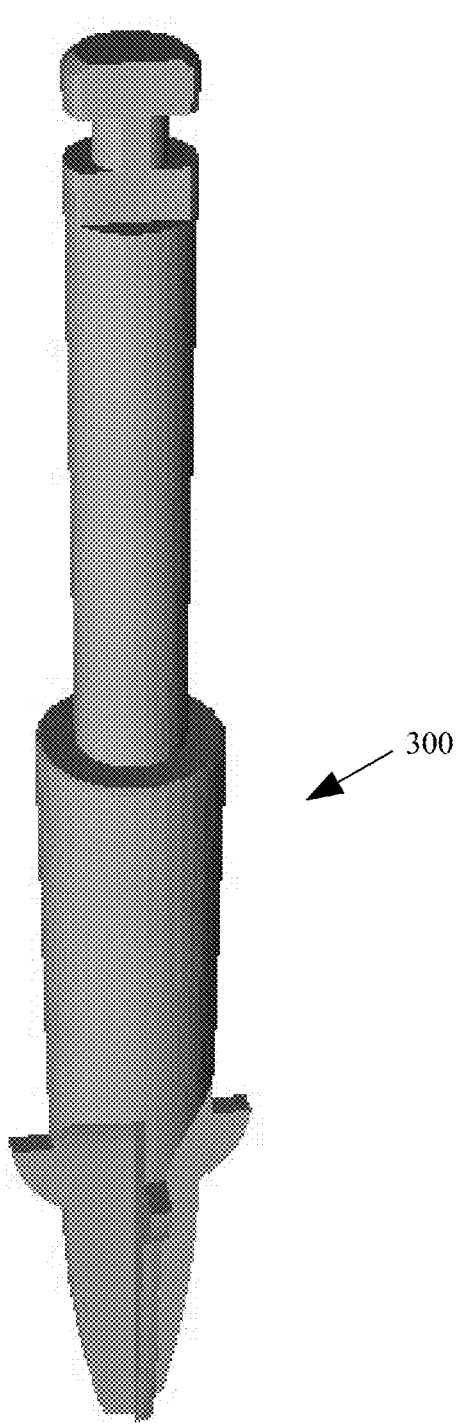
FIG. 24 is a perspective view of the osteotomy drill bit of FIG. 22.

A drill bit 400 is shown in FIG. 24, which may be formed substantially the same as drill bit 300, also being particularly shaped to form a bullet-shaped osteotomy that will receive an implant platform, and to accomplish cutting/drilling of the tooth at the same time by also forming an opening that is shaped like part of a sphere to conform to a portion of an abutment that is supported by the implant platform.

Figure 25:
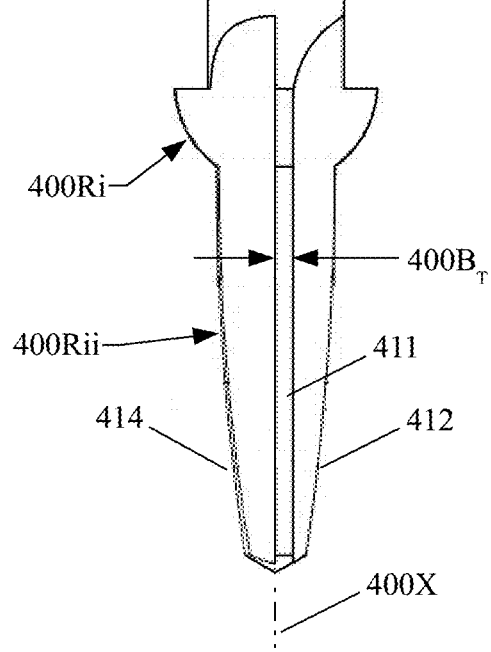
FIG. 25 is a front view of yet another embodiment of an osteotomy drill bit.

Each blade of drill bit 400 has a shaped periphery that includes, just like drill bit 300: a first radiused periphery 400Ri; and a second radiused periphery 400Rii, where a distal end of the first radiused periphery transitions into a proximal end of the second radiused periphery, as seen in FIG. 25. The first radiused periphery 400Ri may also be shaped to form a spherical frustum-shaped socket portion when rotated about the axis 400X of the drill bit.

Figure 26:
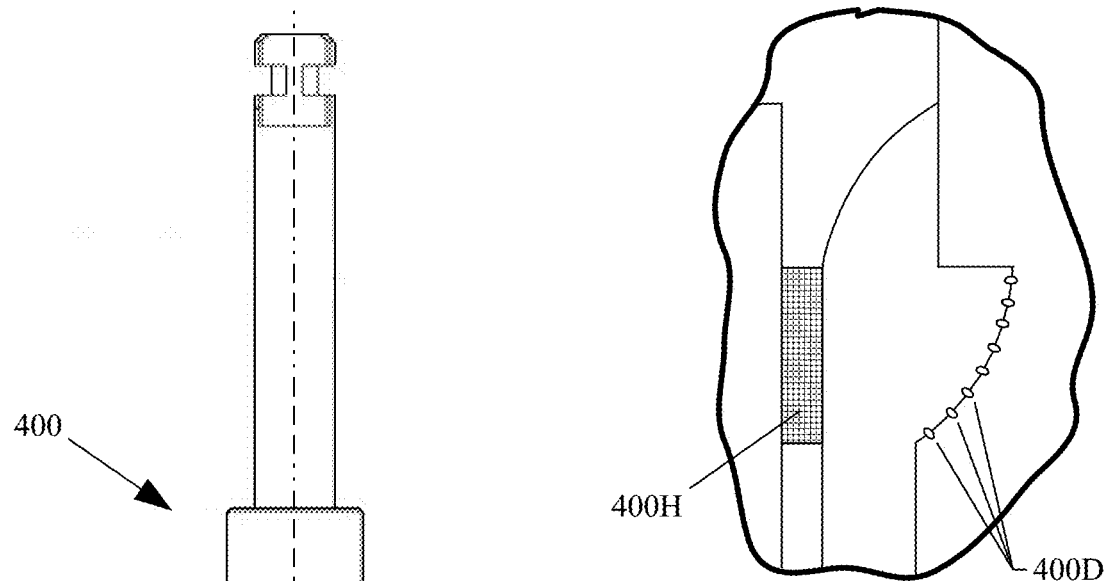
FIG. 26 is an enlarged detail portion of the osteotomy drill bit of FIG. 25.

The drill bit 400 may additionally have on each of the surfaces formed by the first radiused periphery 400Ri, a diamond-like carbon (DLC) coating, or an amorphous diamond coating, or a crystalline diamond coating, or embedded diamond crystals/particles, or a combination thereof, as illustrated in FIG. 25 with the hatching 400H, and in FIG. 26 with the diamond crystals 400D. The diamond crystals may, in one embodiment, be sized in the range of about 30 to about 90 microns, and may be in the range of 90 microns to 180 microns in another embodiment, and may be in the range of 180 micron to 250 microns in yet another embodiment. A combination of such ranges or other particle sizes may be used in other embodiments. Various diamond and diamond-like crystals and methods of coating/embedding them are known in the art, as shown for example by U.S. Pat. No. 4,504,519 to Zelez for "Diamond-Like Film and Process for Producing Same"; U.S. Pat. No. 5,098,535 to Collins for "Amorphous Diamond Material Produced by Laser Plasma Deposition"; U.S. Pat. No. 5,653,812 to Petrmichl for "Method and Apparatus for Deposition of Diamond-Like Carbon Coatings on Drills"; U.S. Pat. No. 5,763,087 to Falabella for "Amorphous Diamond Films"; U.S. Pat. No. 5,766,394 to Anderson for "Method for Forming a Polycrystalline Layer of Ultra Hard Material"; U.S. Pat. No. 5,772,760 to Gruen for "Method for the Preparation of Nanocrystalline Diamond Thin Films"; and U.S. Pat. No. 5,799,549 to Decker for "Amorphous Diamond Coating of Blades." Any one or more of these approaches, or any other approaches now known or later developed in the art of coating/embedding diamond or diamond-like crystals/particles may be used for any of the embodiments described herein.

The process of using the osteotomy drill bit 400 is shown in photos in FIGS. 29-36. The photos of FIG. 27 and FIG.

28 show the prepared prosthesis site. The photo of FIG. 29 shows drilling of a pilot hole in the prosthesis site shown in the photos of FIGS. 27-28. The photo in FIG. 30 shows the completed pilot hole that was drilled in the prosthesis site of FIGS. 27-28. The photo in FIG. 31 shows the osteotomy drill bit of FIG. 25 initially being used to enlarge the pilot hole and form the implant socket. The photo of FIG. 32 shows the osteotomy drill bit of FIG. 25 after reaching the desired depth needed to properly enlarge the pilot hole to form the finished implant socket. The photos of FIG. 33, FIG. 34, and FIG. 35 show the osteotomy drill bit of FIG. 32 being sequentially retracted. The photo of FIG. 36 shows the finished implant socket formed by the osteotomy drill bit of FIG. 25.

Figures 37, 38:
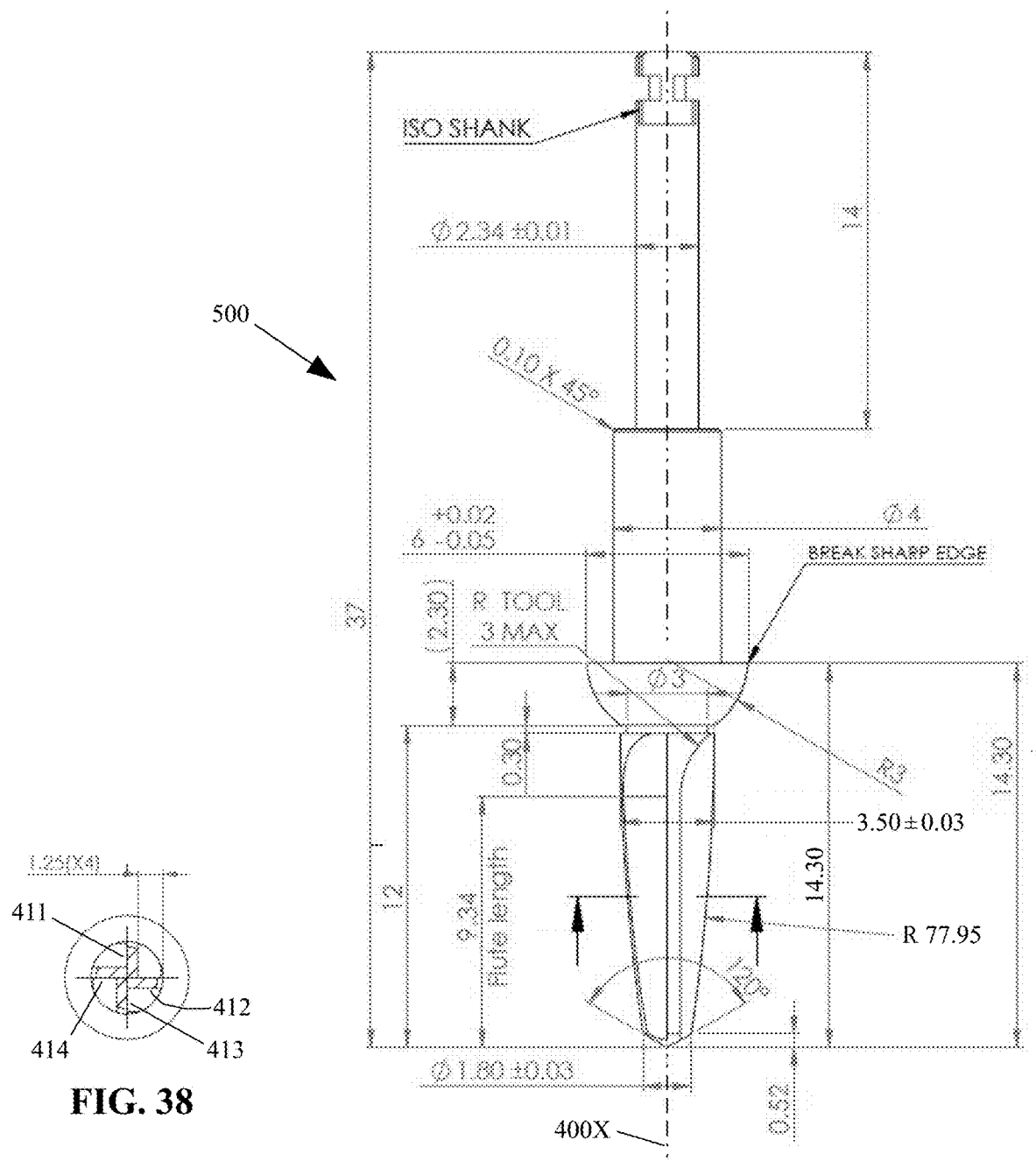
FIG. 37 shows a front view of yet another embodiment of an osteotomy drill bit.
FIG. 38 is a cross-sectional view through the four blades of the osteotomy drill bit of FIG. 37.
Figure 39:
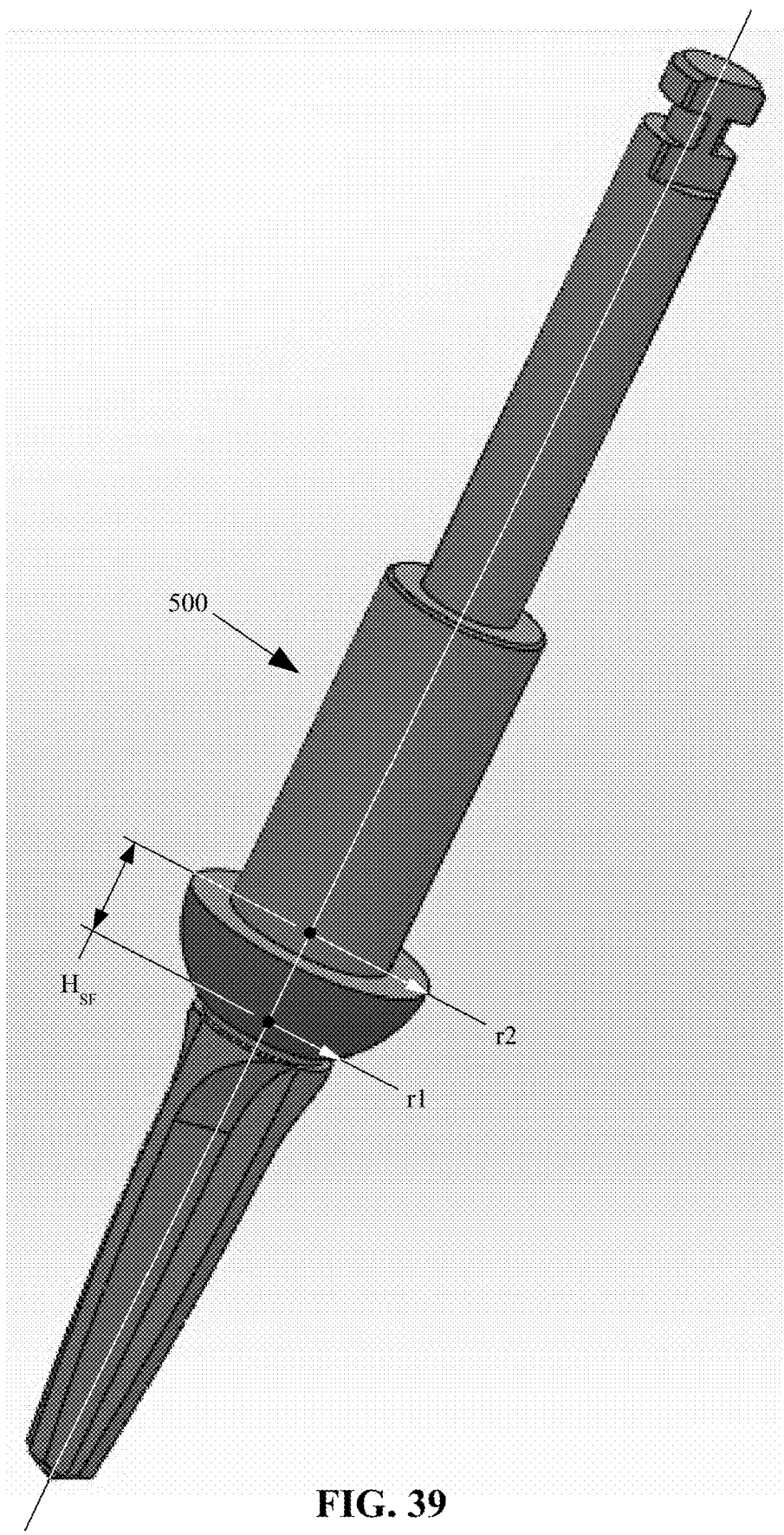
FIG. 39 is a perspective view of the osteotomy drill bit of FIG. 37.

Another embodiment-drill bit 500—is shown in FIGS. 37-39, which may be formed similar to the drill bit 400, and which extends from a first (proximal) end 501 that is configured to be received in a chuck of a dental drill, to a second (distal) end 502. Drill bit 500 is also particularly shaped to have a working portion 500K that is adapted to cut or remove a portion of a tooth and a portion of the bone that supports the tooth (see FIG. 41). The working portion 500K is configured to form a bullet-shaped osteotomy that will receive an implant platform, and to also accomplish cutting/drilling to form an opening that is shaped like part of a sphere, to conform to a portion of an abutment that is supported by the implant platform.

The distal end of the working portion 500K includes four conjoined blades that protrude away from an axis 500X of the drill bit-a first blade 511, a second blade 512, a third blade 513, a fourth blade 514. Each of the blades have a thickness 500B$_T$ and each blade is positioned 90 degrees to an adjacent blade, as seen in FIG. 38. The rake angle may be as described above. Also, the distal ends of the blades may be chamfered as seen generally in FIG. 37 (e.g., a 120 degree chamfer), and as described in more detail hereinabove.

Figure 37A:
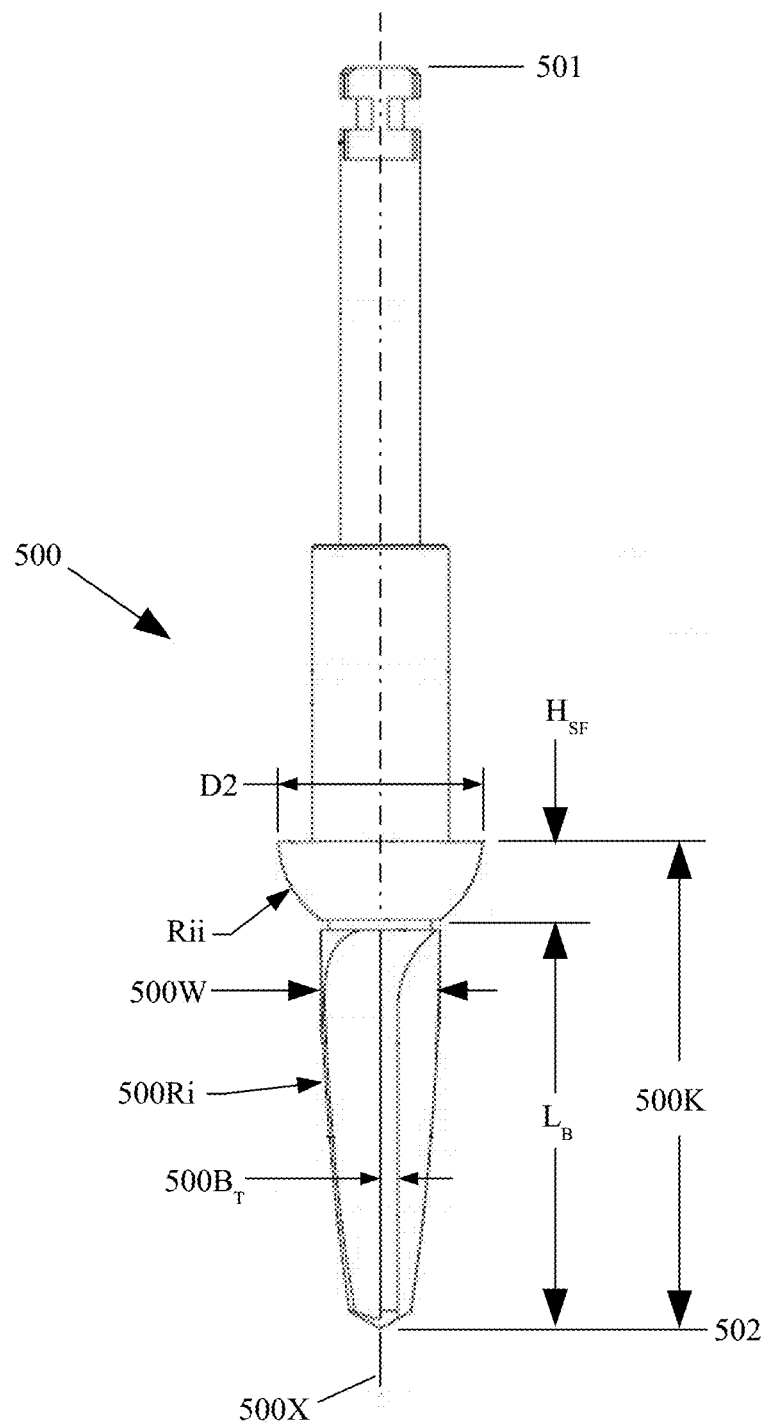
FIG. 37A is the front view of FIG. 37, annotated to identify other features shown therein.

Each of the blades 511, 512, 513, and 514 may have an outer periphery having a radius 500Ri, such that when it is rotated about the axis 500X of the drill bit during the drilling process, it would form a bullet-shaped socket portion that generally matches the shape of the implant platform (see FIG. 41 and FIG. 43). The proximal end of the blades may transition into a spherical frustum portion with an overall radius Rii for the sphere. The transition may be an undercut, or relief cut, as shown in FIG. 37A, or the blades may instead transition into the spherical frustum portion using a small fillet radius (not shown). Any suitable transition may be used.

The curve in FIG. 37A, having a radius Rii, when rotated about the axis 500X of the drill bit, may form a spherical frustum-shaped socket portion that matches the shape of a portion of the abutment (see FIG. 41 and FIG. 43). The spherical frustum portion is defined, as seen in FIG. 37A and FIG. 39, by a first radius $r_1$, a second radius $r_2$, and a height $h_{SF}$, and having a surface area to match a portion of the spherical surface of the abutment, with the surface area of the spherical frustum portion being given by: $2\Pi R_{ii} h_{SF} + \Pi r_1^2 + \Pi r_2^2$.

The surface of the spherical frustum portion of drill bit 500 may have a cutting surface composed of a diamond-like carbon (DLC) coating, or an amorphous diamond coating, or a crystalline diamond coating, or embedded diamond crystals/particles, or a combination thereof, as described hereinabove. The use of the diamond coating or diamond crystals to do the cutting for the abutment is significant, because the coating/crystals:

1) prevent fracturing/chipping of the tooth at that location during drilling; and
2) leave a smooth finish for future restoration.

FIG. 40 is a section view of a jaw, showing a tooth embedded in bone, portions of which will form a prosthesis site, and FIG. 41 is the same section, but showing the osteotomy drill bit of FIG. 37 being used to form the finished implant socket, which may be seen in FIG. 42. As the drill bit progresses to full drilling depth, the hemispherical frustum portion will have formed a portion of a spherical surface being suitable for the abutment, which may leave roughly a 1.0 mm to 1.5 mm thick tooth wall, and not drill into the gum, and it will also have drilled through the axial length of the tooth, such that a portion of its tip has drilled a distance into a portion of the underlying bone (see FIG. 41). In fact, the particular drill bit used is selected from a set of such drill bits, whereby its length $L_B$ (see FIG. 37A) is chosen in order for its tip to go beyond the apex of the tooth root by 3 mm to 4 mm (see FIG. 41), which provides for better implant stability. Note that the maximum diameter of the opening formed by the bullet portion of the particular drill used (i.e., spacing 500W), as well as its contour, is selected depending on the amount of bone and amount of tooth that needs to be removed and the size of the planned implant. In one embodiment, the diameter of the opening formed by the bullet portion of the particular drill used (i.e., by spacing 500W) may be sized to remove most or even all of the lower tooth structure.

The length and diameter of the particular sized drill bit 500 ultimately selected for use on a particular tooth location of a patient is based on the anatomy shown within radiographic images for that patient. Also, the size of the drill bit selected will correspond to the size of the implant platform to be utilized at the particular tooth location, and the implant platform is always a little smaller than the drill bit and the corresponding drilled opening, in order for the threads of the implant to only end up being engaged with bone. Contact between the threads of the implant and tooth structure should be avoided in order for the implant platform to better integrate with the bone through osseointegration, as seen in FIG. 43. To further the process of osseointegration (i.e., growth of the bone around the implant platform to provide support thereto), bone graft chips may be introduced in the gap between the implant and the drilled opening.

FIG. 43 is the section view of FIG. 42, showing a dental implant post positioned in the implant socket, which supports an abutment that holds the crown that replaces the natural visible tooth portion.

Figure 44:
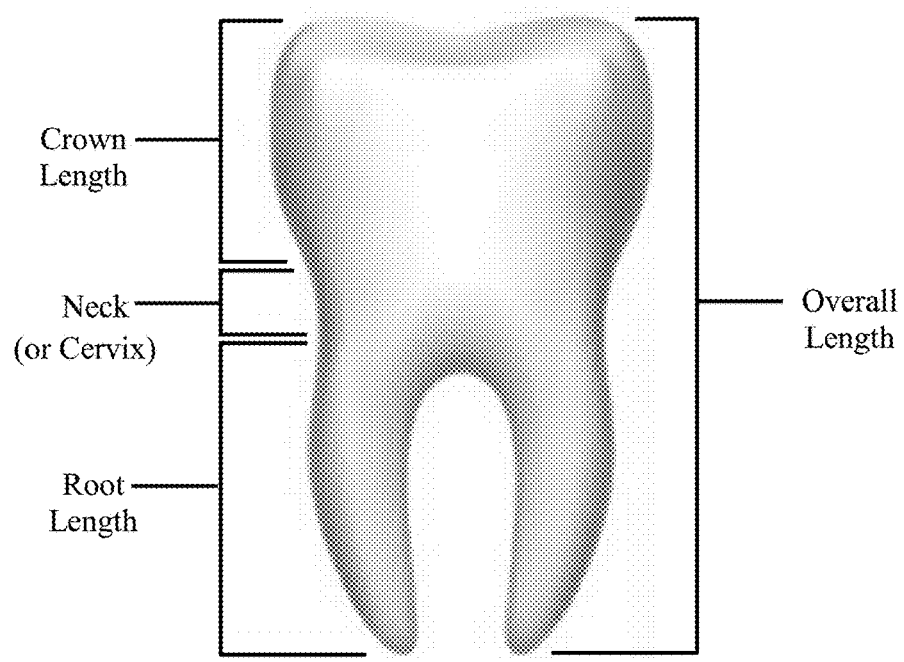
FIG. 44 is a side view showing the main structural regions of a tooth.
Figure 45:
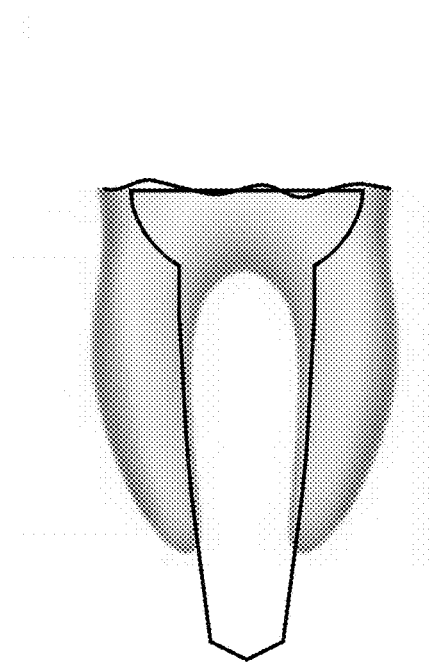
FIG. 45 is the side view of the tooth of FIG. 45 with an implant socket formed therein using the drill bit of FIG. 37.

Other relationships are significant for the proper formation and use of the drill bit 500, particularly in view of the requirements noted hereinabove, and the particular size of the tooth for which the drill bit will ultimately be utilized to form an implant socket. In that regard, FIG. 44 illustrates the main structural regions of a tooth, and the below chart, which is based on a university study, shows different tooth sizes at various different positions within each of a person's maxillary and mandible:

Maxillary Teeth

| | Crown Length mm | Root Length mm | Root-to-Crown Ratio | Over-all Length mm | Crown Width MD mm | Cervix Width MD mm | Crown Width FL mm | Cervix Width FL mm |
|---|---|---|---|---|---|---|---|---|
| Central Incisor | 11.2 | 13.0 | 1.16 | 23.6 | 8.6 | 6.4 | 7.1 | 6.3 |
| Lateral Incisor | 9.8 | 13.4 | 1.37 | 22.5 | 6.6 | 4.7 | 6.2 | 5.8 |
| Canine | 10.6 | 16.5 | 1.56 | 26.3 | 7.6 | 5.6 | 8.1 | 7.6 |
| First Premolar | 8.6 | 13.4 | 1.56 | 21.5 | 7.1 | 4.8 | 9.2 | 8.2 |
| Second Premolar | 7.7 | 14.0 | 1.82 | 21.2 | 6.6 | 4.7 | 9.0 | 8.1 |
| First Molar | 7.5 | 12.9 MB 12.2 DB 13.7 L | 1.72 | 20.1 | 10.4 | 7.9 | 11.5 | 10.7 |
| Second Molar | 7.6 | 12.9 MB 12.1 DB 13.5 L | 1.70 | 20.0 | 9.8 | 7.6 | 11.4 | 10.7 |
| Third Molar | 7.2 | 10.8 MB 10.1 DB 11.2 L | 1.49 | 17.5 | 9.2 | 7.2 | 11.1 | 10.4 |

Mandibular Teeth

| | Crown Length mm | Root Length mm | Root-to-Crown Ratio | Over-all Length mm | Crown Width MD mm | Cervix Width MD mm | Crown Width FL mm | Cervix Width FL mm |
|---|---|---|---|---|---|---|---|---|
| Central Incisor | 8.8 | 12.6 | 1.43 | 20.8 | 5.3 | 3.5 | 5.7 | 5.4 |
| Lateral Incisor | 9.4 | 13.5 | 1.43 | 22.1 | 5.7 | 3.8 | 6.1 | 5.8 |
| Canine | 11.0 | 15.9 | 1.45 | 25.9 | 6.8 | 5.2 | 7.7 | 7.5 |
| First Premolar | 8.8 | 14.4 | 1.64 | 22.4 | 7.0 | 4.8 | 7.7 | 7.0 |
| Second Premolar | 8.2 | 14.7 | 1.80 | 22.1 | 7.1 | 5.0 | 8.2 | 7.3 |
| First Molar | 7.7 | 14.0 M 13.0 D | 1.83 | 20.9 | 11.4 | 9.2 | 10.2 | 9.0 |
| Second Molar | 7.7 | 13.9 M 13.0 D | 1.82 | 20.6 | 10.8 | 9.1 | 9.9 | 8.8 |
| Third Molar | 7.5 | 11.8 M 10.8 D | 1.57 | 18.2 | 11.3 | 9.2 | 10.1 | 8.9 |

As such, the dental drill bit 500 may be formed, as seen in FIG. 37A and FIG. 39, with a diameter D2 of the spherical frustum-shaped portion of the cutting head being coordinated with both a length $L_B$ of the four blades and a height $h_{SF}$ of the spherical frustum-shaped portion, to cause a distal end of the cutting periphery of the four blades of the cutting head to penetrate three to four millimeters beyond an apex of the tooth root (FIG. 41), when the cutting surface on the spherical frustum-shaped portion of the cutting head forms the spherical frustum-shaped socket with a residual tooth wall thickness of about 1.0 to 1.5 millimeters (FIG. 42).

Therefore, $L_B + h_{SF}$ = root length+3-4 mm; and D2=Cervix Width_1-1.5 mm. Note that D2=2 ($r_2$).

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A dental drill bit configured to drill a particularly shaped socket in a portion of a tooth and a portion of a human jawbone, the socket being particularly shaped to receive a dental implant and an abutment therein, said dental drill bit comprising:

a cutting head, said cutting head comprising:
 a first portion with a proximal end and a distal end; and
 a second portion with a proximal end and a distal end, said proximal end of said second portion being positioned adjacent to said distal end of said first portion;

wherein said first portion of said cutting head is formed into a bullet shape, and comprises:

a plurality of flutes;
wherein each of said plurality of flutes is configured to cut away a first portion of the tooth and the portion of the human jawbone when said cutting head is rotated about the axis of said dental drill bit; and
wherein said plurality of flutes of said bullet-shaped first portion are configured to form a bullet-shaped socket portion when rotated about the axis of said dental drill bit, the bullet-shaped socket portion being shaped to match a shape of the dental implant;
wherein said second portion comprises: a spherical frustum shape defined by a first plane that coincides with the equatorial plane of the sphere, and a second plane;
wherein said spherical frustum-shaped second portion comprises: a cutting surface formed with diamond particles;
wherein said diamond particles of said cutting surface on said spherical frustum-shaped second portion are configured to form a spherical frustum-shaped socket portion in a second portion of the tooth, when said cutting head is rotated about the axis of said dental drill bit, being shaped to match at least a portion of a spherical surface of the abutment, without fracturing or chipping of the second portion of the tooth during drilling with said dental drill bit; and
wherein said bullet shape of said first portion is defined by:
an arc segment positioned co-planar with respect to the axis of said dental drill bit and revolved around the axis of said dental drill bit, said arc segment having a first end being coextensive with, and perpendicular to, said second plane, and a second end terminating at the axis of said dental drill bit; and
a radius of said arc segment being greater than a distance between said first end of said arc segment and the axis of said dental drill bit.

2. The dental drill bit according to claim 1, wherein a length of said cutting head and a diameter of said spherical frustum-shaped second portion of said cutting head are coordinated to cause a distal end of said bullet shape of said first portion of said cutting head to penetrate three to four millimeters beyond an apex of the tooth root, when said cutting surface on said spherical frustum-shaped second portion of said cutting head forms the spherical frustum-shaped socket with a residual tooth wall thickness of about 1.0 to 1.5 millimeters.

3. The dental drill bit according to claim 1, wherein said diamond particles are embedded in said spherical frustum-shaped second portion of said cutting head.

4. The dental drill bit according to claim 1, wherein said diamond particles of said cutting surface of said spherical frustum-shaped second portion of said cutting head comprises an amorphous diamond coating.

5. The dental drill bit according to claim 1 wherein said proximal end of said bullet-shaped first portion of said cutting head is chamfered at an angle between 20 degrees and 60 degrees.

6. The dental drill bit according to claim 1,
wherein when said dental drill bit is used to form the particularly shaped socket for an implant being 4 mm in diameter, said radius of said arc segment is about 34.6 mm and said distance between said first end of said arc segment and the axis of said dental drill bit is 2 mm.

7. A dental drill bit configured to drill a particularly shaped socket in a portion of a tooth and a portion of a human jawbone, being shaped to receive a dental implant and an abutment therein, said dental drill bit comprising:
a mounting shank, said mounting shank having a proximal end and a distal end, said proximal end configured to be received within a drill;
a cutting head, said cutting head having a proximal end and a distal end, said proximal end of said cutting head configured to transition into said distal end of said mounting shank; said cutting head comprising:
four blades, said four blades configured to protrude away from an axis of said drill bit, each said blade having a thickness and being spaced apart 90 degrees, with respect to the axis, from an adjacent said blade, to form a cruciform-shaped cross-section; and each said blade having a shaped cutting periphery comprising: a radiused periphery;
wherein said radiused periphery is shaped to form a bullet-shaped socket portion when rotated about the axis of said drill bit, being shaped to match a shape of the dental implant;
a spherical frustum-shaped head portion defined by a first plane that coincides with the equatorial plane of the sphere, and a second plane, said spherical frustum-shaped head portion comprising: a cutting surface;
wherein said cutting surface formed on said spherical frustum-shaped head portion is configured to form a spherical frustum-shaped socket portion, when rotated about the axis of said drill bit, being shaped to match a portion of a spherical surface of the abutment; and
wherein a proximal end of said radiused periphery of each said blade transitions into a distal end of said spherical frustum-shaped head portion;
wherein said radiused periphery is defined by an arc segment positioned co-planar with respect to the axis of said dental drill bit, said arc segment having a first end being coextensive with, and perpendicular to, said second plane, and a second end terminating at the axis of said dental drill bit; and
wherein a radius of said arc segment is greater than a distance between said first end of said arc segment and the axis of said dental drill bit.

8. The dental drill bit according to claim 7, wherein a diameter (D2) of said spherical frustum-shaped head portion of said cutting head is coordinated with both a length ($L_B$) of said four blades and a height ($h_{SF}$) of said spherical frustum-shaped head portion to cause a distal end of said cutting periphery of said four blades of said cutting head to penetrate three to four millimeters beyond an apex of the tooth root, when said cutting surface on said spherical frustum-shaped head portion of said cutting head forms the spherical frustum-shaped socket with a residual tooth wall thickness of about 1.0 to 1.5 millimeters; and wherein $L_B+h_{SF}$=root length plus 3-4 mm; and D2=Cervix Width minus 1-1.5 mm.

9. The dental drill bit according to claim 7, wherein each of said pair of blades are offset laterally, with respect to the axis, a distance about equal to one-half of said blade thickness.

10. The dental drill bit according to claim 7 wherein a distal end of said radiused periphery is chamfered is formed at a 60 degree angle.

11. The dental drill bit according to claim 7 wherein each said blade is formed with a rake angle in a range between 3 degrees and 20 degrees.

12. The dental drill bit according to claim 7 wherein at least a portion of said cutting head is formed with one or more of: a diamond-like carbon coating, an amorphous diamond coating, a crystalline diamond coating, embedded diamond particles, and a combination thereof.

\* \* \* \* \*